(12) United States Patent
Yu et al.

(10) Patent No.: US 12,356,488 B2
(45) Date of Patent: Jul. 8, 2025

(54) COMMUNICATIONS METHOD AND APPARATUS

(71) Applicant: Huawei Technologies Co., Ltd., Shenzhen (CN)

(72) Inventors: Fang Yu, Beijing (CN); Hui Ni, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 17/323,638

(22) Filed: May 18, 2021

(65) Prior Publication Data

US 2021/0274585 A1 Sep. 2, 2021

Related U.S. Application Data

(63) Continuation of application No. PCT/CN2019/119549, filed on Nov. 19, 2019.

(30) Foreign Application Priority Data

Nov. 19, 2018 (CN) .......................... 201811377833.4

(51) Int. Cl.
*H04W 76/22* (2018.01)
*H04L 67/146* (2022.01)
(Continued)

(52) U.S. Cl.
CPC ........... *H04W 76/22* (2018.02); *H04L 67/146* (2013.01); *H04L 67/148* (2013.01); *H04W 8/02* (2013.01);
(Continued)

(58) Field of Classification Search
None
See application file for complete search history.

(56) References Cited

U.S. PATENT DOCUMENTS

| 2005/0041578 A1* | 2/2005 | Huotari | H04L 9/40 370/229 |
| 2016/0087848 A1* | 3/2016 | Heinz | H04L 41/0213 370/256 |

(Continued)

FOREIGN PATENT DOCUMENTS

| CN | 106559832 A | 4/2017 |
| CN | 108156023 A | 6/2018 |

(Continued)

OTHER PUBLICATIONS

3GPP, "3rd Generation Partnership Project; Technical Specification Group Services and System Aspects; Study on 5GS Enhanced support of Vertical and LAN Services", Sep. 2018, 3GPP, Release 16, pp. 1-39.*

(Continued)

*Primary Examiner* — Atta Khan
(74) *Attorney, Agent, or Firm* — Slater Matsil, LLP

(57) ABSTRACT

A communication method, device, and medium are provided, the method including determining, by a terminal device, whether the terminal device supports at least one of a time sensitive networking (TSN) service, a packet data unit (PDU) session corresponding to a TSN service needs to be established, a currently established PDU session needs to carry a TSN stream, or an established PDU session needs to carry a TSN stream, and sending, by the terminal device, port information of the terminal device to a session management network element, where the port information of the terminal device includes a port identifier of the terminal device, and further includes information about a transmission delay between a port of the terminal device and an external neighbor node.

19 Claims, 17 Drawing Sheets

(51) Int. Cl.
  *H04L 67/148* (2022.01)
  *H04W 8/02* (2009.01)
  *H04W 28/24* (2009.01)
  *H04W 76/11* (2018.01)
  *H04W 76/12* (2018.01)

(52) U.S. Cl.
  CPC ............ *H04W 76/11* (2018.02); *H04W 76/12* (2018.02); *H04W 28/24* (2013.01)

(56) References Cited

U.S. PATENT DOCUMENTS

| | | | |
|---|---|---|---|
| 2018/0160424 A1* | 6/2018 | Cavalcanti | H04B 7/0408 |
| 2018/0184438 A1 | 6/2018 | Cavalcanti et al. | |
| 2018/0270144 A1* | 9/2018 | Jiang | H04L 45/02 |
| 2018/0352483 A1* | 12/2018 | Youn | H04L 63/0272 |
| 2020/0259896 A1* | 8/2020 | Sachs | H04L 67/12 |
| 2020/0267785 A1* | 8/2020 | Talebi Fard | H04L 45/04 |
| 2023/0143575 A1* | 5/2023 | Cavalcanti | H04W 72/1273 |
| | | | 370/329 |

FOREIGN PATENT DOCUMENTS

| | | |
|---|---|---|
| CN | 108541031 A | 9/2018 |
| WO | 2017088911 A1 | 6/2017 |

OTHER PUBLICATIONS

Nokia et al., "TSN-QoS Framework", SA WG2 Meeting #129, S2-1810436, Oct. 15-19, 2018, 9 Pages, Dongguan, China.

Huawei et al., "QoS Negotiation between 3GPP and TSN networks KI#3.1", SA WG2 Meeting #129, S2-1811211, Oct. 15-19, 2018, 9 Pages, Dongguan, China.

Huawei et al., "OoS Negotiation between 3GPP and TSN networks KI#3.1", Sa WG2 Meeting #129, S2-1810475, Oct. 15-19, 2018, 10 pages, Dongguan, China.

3GPP TR 23.734 V0.2.0, 3rd Generation Partnership Project, Technical Specification Group Services and System Aspects, Study on 5GS Enhanced support of Vertical and LAN Services (Release 16), Sep. 2018, 39 pages.

3GPP TS 23.501 V15.3.0, 3rd Generation Partnership Project, Technical Specification Group Services and System Aspects, System Architecture for the 5G System, Stage 2 (Release 15), Sep. 2018, 226 pages.

3GPP TS 23.502 V15.3.0, 3rd Generation Partnership Project, Technical Specification Group Services and System Aspects, Procedures for the 5G System, Stage 2 (Release 15), Sep. 2018, 330 pages.

IEEE, "Bridges and Bridged Networks ,Amendment 31: Stream Reservation Protocol (SRP) Enhancements and Performance Improvements", IEEE Std 802.1Qcc-2018, 208 pages.

IEEE, "IEEE Standard for Local and Metropolitan Area Networks—Bridges and Bridged Networks", IEEE Std 802.1Q-2018, 1993 pages.

IEEE, "IEEE Standard for Local and metropolitan area networks—Station and Media Access Control Connectivity Discovery ", IEEE Std 802.1AB-2016, 146 pages.

IEEE, "IEEE Standard for Local and metropolitan area networks—Frame Replication and Elimination for Reliability", IEEE Std 802.1CB-2017, 102 pages.

IEEE, "IEEE Standard for Local and metropolitan area networks—Virtual bridged local area networks—Amendment 14: stream reservation protocol (SRP)", IEEE Std 802.1Qat-2010, 119 pages.

"3rd Generation Partnership Project; Technical Specification Group Services and System Aspects; Policy and Charging Control Framework for the 5G System; Stage 2 (Release 15)," 3GPP TS 23.503 V15.3.0, Sep. 2018, 70 pages.

* cited by examiner

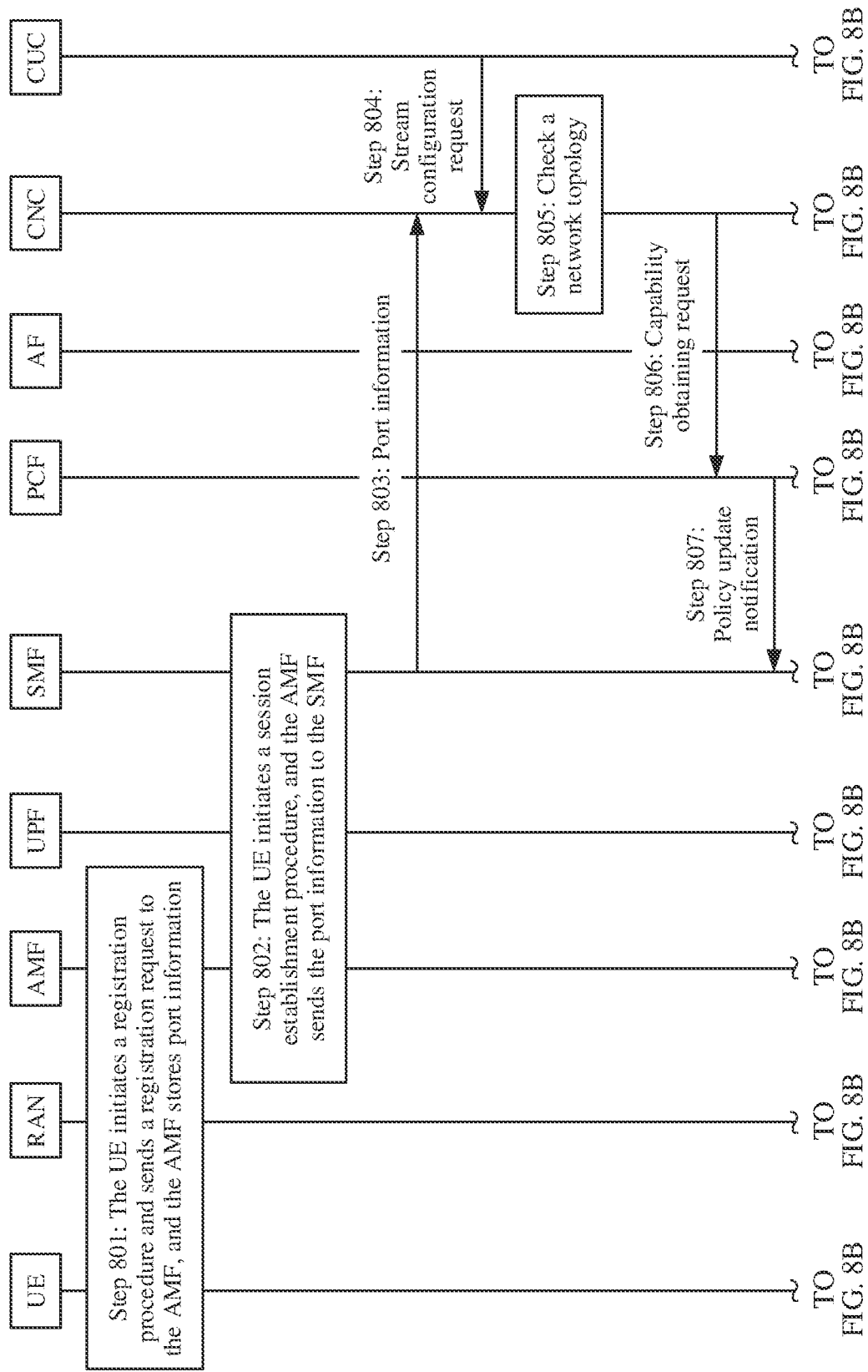

COMMUNICATIONS METHOD AND APPARATUS

CROSS-REFERENCE TO RELATED APPLICATIONS

This application is a continuation of International Application No. PCT/CN2019/119549, filed on Nov. 19, 2019, which claims priority to Chinese Patent Application No. 201811377833.4, filed on Nov. 19, 2018. The disclosures of the aforementioned applications are hereby incorporated by reference in their entireties.

TECHNICAL FIELD

This application relates to the field of communications technologies, and in particular, to a communications method and apparatus.

BACKGROUND

Different from a conventional Ethernet that cannot provide highly reliable data transmission and ensure a low delay, time sensitive networking (TSN) is generated based on the conventional Ethernet. The TSN has both real-time performance and a deterministic capability, and can ensure reliability of service data transmission. In addition, an end-to-end transmission delay in a data transmission process can also be predicted. In view of advantages of the TSN, the TSN is widely used in fields such as automobile control and an industrial internet.

Currently, to implement end-to-end reliable data transmission in a 5th generation mobile communications (5G) system by using the TSN, an assumption that the 5G system is virtualized as a switching node in the TSN is proposed, and it is considered that a control plane of a TSN adaptation function is added to an application function (AF) network element and a user plane of the TSN adaptation function is added to a user plane function (UPF) network element and user equipment (UE) in a network architecture of the 5G system. However, the foregoing assumption is merely an idea, and no specific solution in which the 5G system and the TSN are integrated to implement data transmission is proposed.

SUMMARY

This application provides a communications method and apparatus, to virtualize a 5G system as a switching node in TSN, to implement data transmission.

According to a first aspect, an embodiment of this application provides a communication method. The method includes, first, a session management network element may obtain port information of a terminal device. The port information of the terminal device includes a port identifier of the terminal device and information about a transmission delay between a port of the terminal device and an external neighbor node. Then, the session management network element sends the port information of the terminal device to a centralized network configuration network element.

According to the foregoing method, the session management network element may send the port information of the terminal device to the centralized network configuration network element in time sensitive networking, and have a capability of reporting port information of a virtual switching node (a communications system functions as the virtual switching node), so that the centralized network configuration network element can determine information (for example, the port information of the virtual switching node), and then end-to-end data transmission can be implemented based on the information about the virtual switching node.

In a possible design, the session management network element obtains the port information of the terminal device in a plurality of manners. The following lists two of the manners.

In a first manner, in a PDU session establishment process, the session management network element receives a protocol data unit (PDU) session establishment request from the terminal device, where the PDU session establishment request includes the port information of the terminal device, and obtains the port information of the terminal device from the PDU session establishment request.

In a second manner, in a PDU session modification process, the session management network element receives a PDU session modification response from the terminal device, where the PDU session modification response includes the port information of the terminal device, and obtains the port information of the terminal device from the PDU session modification response.

According to the foregoing method, the session management network element can flexibly obtain the port information of the terminal device in the existing PDU session establishment process or PDU session modification process, so that an application scenario is extended, and an application scope can be wider.

In a possible design, in addition to reporting the port information of the terminal device to the centralized network configuration network element, the session management network element may further report other information of the virtual switching node, for example, delay information. Specifically, in a procedure of establishing a quality of service (Qos) flow of the terminal device, the session management network element may determine a transmission delay between a user plane corresponding to the QoS flow and the terminal device, and then send the transmission delay to the centralized network configuration network element.

According to the foregoing method, the session management network element determines the transmission delay, sends the transmission delay to the centralized network configuration network element, and has a capability of reporting delay information of the virtual switching node (the communications system functions as the virtual switching node), so that the centralized network configuration network element can determine the delay information of the virtual switching node, and then end-to-end data transmission can be implemented based on the information about the virtual switching node.

In a possible design, the session management network element may determine the transmission delay between the user plane corresponding to the QoS flow and the terminal device by using the following method. The session management network element first obtains a policy and charging control rule (PCC rule) of the QoS flow from a policy control network element, and then determines the transmission delay according to the PCC rule of the QoS flow.

According to the foregoing method, the session management network element can more efficiently and conveniently determine the transmission delay according to the existing PCC rule of a QoS flow, thereby improving information reporting efficiency.

In a possible design, that the session management network element determines the transmission delay according to the PCC rule of the QoS flow may be that a packet delay budget (PDB) of the QoS flow is first determined based on a 5th generation mobile communications quality of service identifier (5QI) included in the PCC rule, and then, the transmission delay is determined based on the PDB. For example, the PDB may be used as the transmission delay, or the PDB may be adjusted, and an adjusted PDB is used as the transmission delay.

According to the foregoing method, the session management network element can more quickly and accurately determine the transmission delay based on the 5QI, so that it can be ensured that subsequently, the transmission delay is reported to the centralized network configuration network element relatively efficiently.

In a possible design, before the session management network element obtains the port information of the terminal device, the session management network element may indicate the terminal device to determine the port information of the terminal device. Specifically, the session management network element may send a first indication message to the terminal device, and the first indication message is used to indicate the terminal device to determine the port information of the terminal device.

According to the foregoing method, after receiving the first indication message, the terminal device can determine the port information of the terminal device, to ensure that subsequently, the port information of the terminal device can be sent to the session management network element more quickly.

In a possible design, the port information of the terminal device may further include external topology information of the port of the terminal device.

According to the foregoing method, the port information of the terminal device carries more information, so that after receiving the port information of the terminal device, the centralized network configuration network element can determine external topology information of the virtual switching node, thereby facilitating better implementation of end-to-end data transmission subsequently.

According to a second aspect, an embodiment of this application provides a communication method. The method includes, first, a terminal device determines that port information of the terminal device needs to be reported, where specifically, cases in which the port information of the terminal device needs to be reported include a part or all of the following, the terminal device supports a TSN service, a packet data unit PDU session corresponding to a TSN service needs to be established, a currently established PDU session needs to carry a TSN stream, or an established PDU session needs to carry a TSN stream. Then, the terminal device sends the port information of the terminal device to a session management network element. The port information of the terminal device includes a port identifier of the terminal device and information about a transmission delay between a port of the terminal device and an external neighbor node.

According to the foregoing method, after determining that the port information of the terminal device needs to be reported, the terminal device reports the port information of the terminal device to the session management network element, so that the session management network element reports the port information of the terminal device to the centralized network configuration network element. This helps the centralized network configuration network element determine information (such as port information) about the virtual switching node, and then, end-to-end data transmission can be implemented based on the information about the virtual switching node.

In a possible design, the terminal device sends the port information of the terminal device to the session management network element in many manners. The following lists one of the manners. In a PDU session establishment process, the terminal device may send a PDU session establishment request to the session management network element through an access and mobility management network element. The PDU session establishment request includes the port information of the terminal device.

According to the foregoing method, the terminal device may flexibly report the port information of the terminal device to the session management network element in the existing PDU session establishment process, so that an application scenario is extended, and an application scope can be wider.

In a possible design, the terminal device sends the port information of the terminal device to the session management network element in many manners. The following lists another manner. During registration of the terminal device, the terminal device sends, to an access and mobility management network element, a registration request that carries the port information of the terminal device. Then, subsequently, the access and mobility management network element may send a PDU session establishment request including the port information of the terminal device to the session management network element when receiving the PDU session establishment request sent by the terminal device.

According to the foregoing method, the terminal device may flexibly send the port information of the terminal device to the access and mobility management network element in an existing registration process. This can reduce signaling, is applicable to an existing registration scenario, and effectively extends an application scenario.

In a possible design, the terminal device may determine, based on indication information in a PDU session modification request from the session management network element, that the established PDU session needs to carry the TSN stream. After receiving the indication message, the terminal device may send, to the session management, a PDU session modification response that carries the port information of the terminal device.

According to the foregoing method, the terminal device may flexibly report the port information of the terminal device to the session management network element in the existing PDU session modification process. This can improve signaling resource utilization, is applicable to an existing PDU session modification scenario, and can effectively extend an application scenario.

In a possible design, the terminal device may determine, based on indication information in a PDU session establishment acknowledgment message from the session management network element, that the established PDU session needs to carry the TSN stream, and report the port information of the terminal device to the session management network element after determining that the established PDU session needs to carry the TSN stream.

According to the foregoing method, the terminal device may flexibly determine, in the existing PDU session establishment process, that the established PDU session needs to carry the TSN stream, and then may report the port information of the terminal device to the session management network element. This extends an application scenario, so that an application scope can be wider.

In a possible design, the terminal device may determine, based on a data network name (DNN) of the PDU session that needs to be established, that the PDU session needs to carry the TSN stream.

According to the foregoing method, the terminal device may relatively conveniently and simply determine, based on a parameter (e.g., the DNN) of the PDU session, that the established PDU session needs to carry the TSN stream, and then may report the port information of the terminal device to the session management network element, thereby improving information reporting efficiency.

In a possible design, before the terminal device sends the port information of the terminal device to the session management network element, the terminal device may autonomously determine the port information of the terminal device in advance, or may determine the port information of the terminal device after receiving a first indication message from the session management network element, where the first indication message is used to indicate the terminal device to determine the port information of the terminal device.

According to the foregoing method, the terminal device may determine the port information of the terminal device after receiving the first indication message, so that the port information of the terminal device can be determined more efficiently.

In a possible design, the port information of the terminal device may further include external topology information of the port of the terminal device.

According to the foregoing method, the port information of the terminal device carries more information, so that after receiving the port information of the terminal device, the centralized network configuration network element can determine external topology information of the virtual switching node, thereby facilitating better implementation of end-to-end data transmission subsequently.

According to a third aspect, an embodiment of this application provides a communication method. The method includes, first, after a session management network element determines that an anchor user plane network element of a PDU session of a terminal device needs to be switched from a first user plane network element to a second user plane network element, if the session management network element determines that the PDU session is a session that communicates with time sensitive networking TSN, the session management network element sends a first notification message to a centralized network configuration network element. The first notification message is used to notify the centralized network configuration network element that port information of a first virtual switching node and/or port information of a second virtual switching node are/is updated, the first virtual switching node is a virtual switching node corresponding to the first user plane network element, and the second virtual switching node is a virtual switching node corresponding to the second user plane network element.

According to the foregoing method, when the anchor user plane network element is switched, a virtual switching node changes. After determining that the anchor user plane network element needs to be switched, the session management network element may notify the centralized network configuration network element in a timely manner, so that the centralized network configuration network element can correspondingly update information about the virtual switching node in a more efficient and timely manner.

In a possible design, when the session management network element determines that the PDU session carries a TSN stream, the first notification message may be further used to notify that a virtual switching node of the TSN stream needs to change from the first virtual switching node to the second virtual switching node.

According to the foregoing method, if the PDU session carries the TSN stream, after determining that the anchor user plane network element needs to be switched, the session management network element may notify the centralized network configuration network element in a timely manner, so that the centralized network configuration network element can perform configuration update on the TSN stream in a more efficient and timely manner.

In a possible design, the anchor user plane network element is switched, so that the virtual switching node changes, and the port information of the first virtual switching node and the port information of the second virtual switching node change. Before the session management network element sends the first notification message to the centralized network configuration network element, the session management network element may update the port information of the first virtual switching node and the port information of the second virtual switching node based on port information of the terminal device.

According to the foregoing method, the port information of the first virtual switching node and the port information of the second virtual switching node may be quickly updated when the anchor user plane network element is switched, so that the port information of the first virtual switching node and the port information of the second virtual switching node may be more accurate.

In a possible design, the first notification message may further carry some related information. The following lists two types of the related information.

First type of related information is an identifier of the second virtual switching node and updated port information of the second virtual switching node.

Second type of related information is an identifier of the second virtual switching node and port information used by the second virtual switching node to transmit the TSN stream.

According to the foregoing method, the first notification message carries related port information, so that the centralized network configuration network element can accurately update the port information of the second virtual switching node after receiving the first notification message.

In a possible design, the first notification message further includes identification information of the first virtual switching node and updated port information of the first virtual switching node by the session management.

According to the foregoing method, the first notification message carries related port information, so that the centralized network configuration network element can accurately update the port information of the first virtual switching node after receiving the first notification message.

In a possible design, the first notification message further includes an identifier of the TSN stream.

According to the foregoing method, the identifier of the TSN stream may definitely indicate a TSN stream affected because the anchor user plane network element is switched, so that the centralized network configuration network element can accurately learn that the TSN stream is affected and may need to be reconfigured.

In a possible design, after the session management network element sends the first notification message to the centralized network configuration network element, the session management network element may receive a notification response message from the centralized network configuration network element, and the notification response message is used to indicate that the centralized network configuration network element has completed the configuration update on the TSN stream.

According to the foregoing method, the session management network element may more definitely determine that the TSN stream has been reconfigured, so that the session management network element performs a subsequent operation, for example, completes internal switching of the virtual switching node.

In a possible design, after the session management network element receives the notification response message from the centralized network configuration network element, the session management network element switches the anchor user plane network element of the PDU session from the first user plane network element to the second user plane network element, to establish a connection between an access network node and the second user plane network element.

According to the foregoing method, the internal switching of the virtual switching node is completed, so that data transmission is more efficiently performed subsequently.

In a possible design, after the session management network element receives the notification response message from the centralized network configuration network element, the session management network element sends a second notification message to the centralized network configuration network element, and the second notification message is used to notify the centralized network configuration that the virtual switching node of the TSN stream changes from the first virtual switching node to the second virtual switching node.

According to the foregoing method, the session management network element may flexibly notify, by using the second notification message, the centralized network configuration network element that the switching from the first virtual switching node to the second virtual switching node is completed.

According to a fourth aspect, an embodiment of this application provides a communication method. The method includes, first, a centralized network configuration network element receives a first notification message from a session management network element. The first notification message is used to notify that port information of a first virtual switching node and/or port information of a second virtual switching node are/is updated.

According to the foregoing method, the centralized network configuration network element may learn of a change of port information of a virtual switching node in a relatively efficient and timely manner.

In a possible design, if the first notification message is further used to notify that a virtual switching node of a TSN stream needs to change from the first virtual switching node to the second virtual switching node, the centralized network configuration network element may further reconfigure a transmission path for the TSN stream based on the first notification message.

According to the foregoing method, the centralized network configuration network element may learn, in a relatively timely manner, that the virtual switching node is switched, reconfigure the transmission path for the TSN stream relatively quickly, and complete configuration update on the TSN stream.

In a possible design, the first notification message may further carry some related information. The following lists two types of the related information.

First type of related information is an identifier of the second virtual switching node and updated port information of the second virtual switching node.

Second type of related information is an identifier of the second virtual switching node and port information used by the second virtual switching node to transmit the TSN stream.

According to the foregoing method, the first notification message carries related port information, so that the centralized network configuration network element can accurately update the port information of the second virtual switching node after receiving the first notification message.

In a possible design, the first notification message further includes identification information of the first virtual switching node and updated port information of the first virtual switching node by the session management.

According to the foregoing method, the first notification message carries related port information, so that the centralized network configuration network element can accurately update the port information of the first virtual switching node after receiving the first notification message.

In a possible design, the first notification message further includes an identifier of the TSN stream.

According to the foregoing method, the identifier of the TSN stream may definitely indicate a TSN stream affected because an anchor user plane network element is switched, so that the centralized network configuration network element can accurately learn that the TSN stream is affected and may need to be reconfigured.

In a possible design, after updating a configuration of the TSN stream, the centralized network configuration network element may further send a notification response message to the session management network element, and the notification response message is used to indicate that the centralized network configuration network element has completed the configuration update on the TSN stream.

According to the foregoing method, the session management network element may more definitely determine that the TSN stream has been reconfigured, so that the session management network element performs a subsequent operation, for example, completes internal switching of the virtual switching node.

In a possible design, the centralized network configuration network element may further receive a second notification message from the session management network element. The second notification message is used to notify that the virtual switching node of the TSN stream changes from the first virtual switching node to the second virtual switching node. Then, the centralized network configuration network element releases a resource on a source transmission path of the TSN stream.

According to the foregoing method, the centralized network configuration network element may determine, by using the second notification message, that the switching of the virtual switching node has been completed, and release the resource on the source transmission path of the TSN stream, so that resources can be effectively saved.

According to a fifth aspect, an embodiment of this application provides a communication method. The method includes, first, a first core network element may determine corresponding delay information based on a quality of service identifier of a terminal device. The delay information is used to indicate a transmission delay between the terminal device and a user plane network element. Then, the first core network element determines, based on a TSN service type corresponding to the quality of service identifier and the delay information, delay information corresponding to the TSN service type, and then sends a first message to a centralized network configuration network element. The first message carries the delay information corresponding to the TSN service type.

According to the foregoing method, the first core network element may relatively flexibly and conveniently determine, based on the quality of service identifier, the delay information corresponding to the TSN service type, so that the centralized network configuration network element can more quickly obtain the delay information corresponding to the TSN service type.

In a possible design, before determining the corresponding delay information based on the quality of service identifier of the terminal device, the first core network element needs to obtain the quality of service identifier. Specifically, the first core network element may determine the quality of service identifier based on subscription information of the terminal device.

According to the foregoing method, the quality of service identifier is determined based on the subscription information that is of the terminal device and that is relatively easy to obtain, so that subsequently, the delay information corresponding to the TSN service type can be determined more quickly based on the quality of service identifier.

According to a sixth aspect, an embodiment of this application further provides a communications apparatus. The communications apparatus is used in a session management network element. For beneficial effects, refer to the descriptions in the first aspect. Details are not described herein again. The apparatus has a function of implementing an action in the method example in the first aspect. The function may be implemented by hardware, or may be implemented by hardware executing corresponding software. The hardware or the software includes one or more modules corresponding to the function. In a possible design, a structure of the apparatus includes a receiving unit and a sending unit, and may further include a processing unit. These units may perform corresponding functions in the method example in the first aspect. For details, refer to the detailed descriptions in the method example. Details are not described herein again.

According to a seventh aspect, an embodiment of this application further provides a communications apparatus. The communications apparatus is used in a terminal device. For beneficial effects, refer to the descriptions in the second aspect. Details are not described herein again. The apparatus has a function of implementing an action in the method example in the second aspect. The function may be implemented by hardware, or may be implemented by hardware executing corresponding software. The hardware or the software includes one or more modules corresponding to the function. In a possible design, a structure of the apparatus includes a processing unit and a sending unit, and may further include a receiving unit. These units may perform corresponding functions in the method example in the second aspect. For details, refer to the detailed descriptions in the method example. Details are not described herein again.

According to an eighth aspect, an embodiment of this application further provides a communications apparatus. The communications apparatus is used in a session management network element device. For beneficial effects, refer to the descriptions in the third aspect. Details are not described herein again. The apparatus has a function of implementing an action in the method example in the third aspect. The function may be implemented by hardware, or may be implemented by hardware executing corresponding software. The hardware or the software includes one or more modules corresponding to the function. In a possible design, a structure of the apparatus includes a processing unit and a sending unit, and may further include a receiving unit. These units may perform corresponding functions in the method example in the third aspect. For details, refer to the detailed descriptions in the method example. Details are not described herein again.

According to a ninth aspect, an embodiment of this application further provides a communications apparatus. The communications apparatus is used in a centralized network configuration network element. For beneficial effects, refer to the descriptions in the fourth aspect. Details are not described herein again. The apparatus has a function of implementing an action in the method example in the fourth aspect. The function may be implemented by hardware, or may be implemented by hardware executing corresponding software. The hardware or the software includes one or more modules corresponding to the function. In a possible design, a structure of the apparatus includes a receiving unit, and may further include a processing unit and a sending unit. These units may perform corresponding functions in the method example in the fourth aspect. For details, refer to the detailed descriptions in the method example. Details are not described herein again.

According to a tenth aspect, an embodiment of this application further provides a communications apparatus. The communications apparatus is used in a first core network element. For beneficial effects, refer to the descriptions in the fifth aspect. Details are not described herein again. The apparatus has a function of implementing an action in the method example in the fifth aspect. The function may be implemented by hardware, or may be implemented by hardware executing corresponding software. The hardware or the software includes one or more modules corresponding to the function. In a possible design, a structure of the apparatus includes a processing unit and a sending unit. These units may perform corresponding functions in the method example in the fourth aspect. For details, refer to the detailed descriptions in the method example. Details are not described herein again.

According to an eleventh aspect, an embodiment of this application further provides a communications apparatus. The communications apparatus is used in a session management network element. For beneficial effects, refer to the descriptions in the first aspect. Details are not described herein again. A structure of the communications apparatus includes a processor and a memory. The processor is configured to support the base station in performing a corresponding function in the method in the first aspect. The memory is coupled to the processor and stores program instructions and data that are necessary for the communications apparatus. The structure of the communications apparatus further includes a communications interface, configured to communicate with another device.

According to a twelfth aspect, an embodiment of this application further provides a communications apparatus. The communications apparatus is used in a terminal device. For beneficial effects, refer to the descriptions in the second aspect. Details are not described herein again. A structure of the communications apparatus includes a processor and a memory. The processor is configured to support the base station in performing a corresponding function in the method in the second aspect. The memory is coupled to the processor and stores program instructions and data that are necessary for the communications apparatus. The structure of the communications apparatus further includes a transceiver, configured to communicate with another device.

According to a thirteenth aspect, an embodiment of this application further provides a communications apparatus. The communications apparatus is used in a session management network element. For beneficial effects, refer to the descriptions in the third aspect. Details are not described herein again. A structure of the communications apparatus includes a processor and a memory. The processor is configured to support the base station in performing a corresponding function in the method in the third aspect. The memory is coupled to the processor and stores program instructions and data that are necessary for the communications apparatus. The structure of the communications apparatus further includes a communications interface, configured to communicate with another device.

According to a fourteenth aspect, an embodiment of this application further provides a communications apparatus. The communications apparatus is used in a centralized network configuration network element. For beneficial effects, refer to the descriptions in the fourth aspect. Details are not described herein again. A structure of the communications apparatus includes a processor and a memory. The processor is configured to support the base station in performing a corresponding function in the method in the fourth aspect. The memory is coupled to the processor and stores program instructions and data that are necessary for the communications apparatus. The structure of the communications apparatus further includes a communications interface, configured to communicate with another device.

According to a fifteenth aspect, an embodiment of this application further provides a communications apparatus. The communications apparatus is used in a first core network element. For beneficial effects, refer to the descriptions in the fifth aspect. Details are not described herein again. A structure of the communications apparatus includes a processor and a memory. The processor is configured to support the base station in performing a corresponding function in the method in the fifth aspect. The memory is coupled to the processor and stores program instructions and data that are necessary for the communications apparatus. The structure of the communications apparatus further includes a communications interface, configured to communicate with another device.

According to a sixteenth aspect, this application further provides a computer-readable storage medium. The computer-readable storage medium stores instructions, and when the instructions are run on a computer, the computer is enabled to perform the method in each of the foregoing aspects.

According to a seventeenth aspect, this application further provides a computer program product including instructions. When the computer program product runs on a computer, the computer is enabled to perform the method in each of the foregoing aspects.

According to an eighteenth aspect, this application further provides a computer chip. The chip is connected to a memory. The chip is configured to read and execute a software program stored in the memory, to perform the method in each of the foregoing aspects.

DETAILED DESCRIPTION OF ILLUSTRATIVE EMBODIMENTS

This application provides a communications method and apparatus, to virtualize a 5G system as a switching node in TSN, thereby ensuring that end-to-end data transmission can be subsequently implemented.

To make the objectives, technical solutions, and advantages of this application clearer, the following further describes this application in detail with reference to the accompanying drawings. In the descriptions of this application, unless otherwise specified, "/" indicates an "or" relationship between associated objects. For example, A/B may indicate A or B. The term "and/or" in this application describes only an association relationship between the associated objects and indicates that three relationships may exist. For example, A and/or B may indicate the following three cases, only A exists, both A and B exist, and only B exists, where A and B may be singular or plural. In addition, in the descriptions of this application, unless otherwise specified, "a plurality of" means two or more than two.

Embodiments of this application relate to a communication method in which a 5G system is virtualized as a switching node in TSN by integrating the 5G system and the TSN. The following first describes the 5G system, the TSN, and a network architecture to which the embodiments of this application are applicable.

Figure 1:
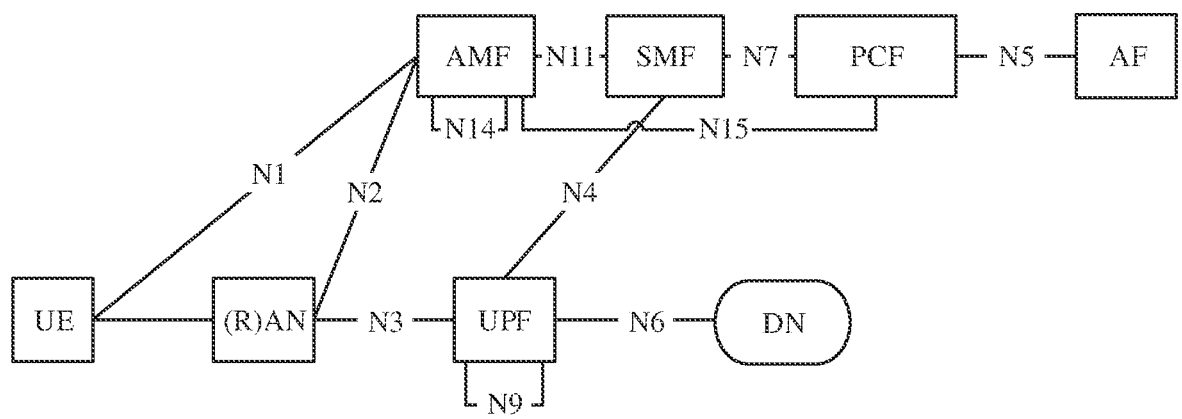
FIG. 1 is a schematic diagram of a network architecture of a 5G system.

FIG. 1 is a schematic diagram of a network architecture of a 5G system. The network architecture is a 5G network architecture. A network element in the 5G architecture includes a terminal device. In FIG. 1, an example in which the terminal device is UE is used. The network architecture further includes a radio access network (RAN), an access and mobility management function (AMF) network element, a session management function (SMF) network element, a user plane function (UPF) network element, a policy control function (PCF) network element, an application function (AF) network element, a data network (DN), and the like.

A main function of the RAN is to control a user to access a mobile communications network in a wireless manner. The RAN is a part of the mobile communications network, and implements a radio access technology. Conceptually, the RAN camps between devices (such as a mobile phone, a computer, or any remote controller) and provides a connection to a core network of the devices. The AMF network element is responsible for access management and mobility management of a terminal. In actual application, the AMF network element includes a mobility management function of an MME in an LTE network architecture, and an access management function is added.

The SMF network element is responsible for session management, for example, establishment of user sessions.

The UPF network element is a function network element of a user plane, and is mainly responsible for connecting to an external network. The UPF network element includes related functions of a serving gateway (SGW) and a public data network gateway (PDN-GW) in LTE.

The DN is a network responsible for providing a service for the terminal. For example, some DNs provide a network access function for terminals, and some other DNs provide a short messaging function for terminals.

A main function of the PCF network element is policy control execution. Similar to a policy and charging rules function (PCRF) network element in LTE, the PCF network element is mainly responsible for policy authorization, quality of service, and charging rule generation, and delivers a corresponding rule to the UPF network element through the SMF network element, to complete installation of a corresponding policy and rule.

The AF network element may be an application control platform of a third party, or may be a device of an operator. The AF network element may provide a service for a plurality of application servers. The AF network element is a function network element that can provide various business services, can interact with a core network through an NEF network element, and can interact with a policy management framework to perform policy management.

In addition, although not shown, a control plane function network element of the core network further includes the network exposure function (NEF) network element, a unified data management (UDM) network element, and a unified data repository (UDR) network element. The NEF network element is configured to, provide a framework, authentication, and an interface that are related to network capability exposure, and transfer information between a 5G system network function and another network function. The UDR network element is mainly configured to store user-related subscription data, policy data, open structured data, and application data. The UDM network element may store subscription information of a user, to implement a backend similar to an HSS in 4G.

The terminal device in this application is also referred to as user equipment (UE), is a device having a wireless transceiver function, and may be deployed on the land, including an indoor or outdoor device, a hand-held device, a wearable device, or a vehicle-mounted device. The terminal device may also be deployed on the water surface (for example, in a steamship), or may be deployed in the air (for example, on an airplane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The TSN is described below. The TSN usually includes a switching node (bridge) and a data terminal (end station). The data terminal and the switching node may form a network topology structure. The switching node may forward a packet by using a forwarding rule configured or created by the switching node, and forward the packet to the data terminal or another switching node.

Figure 2:
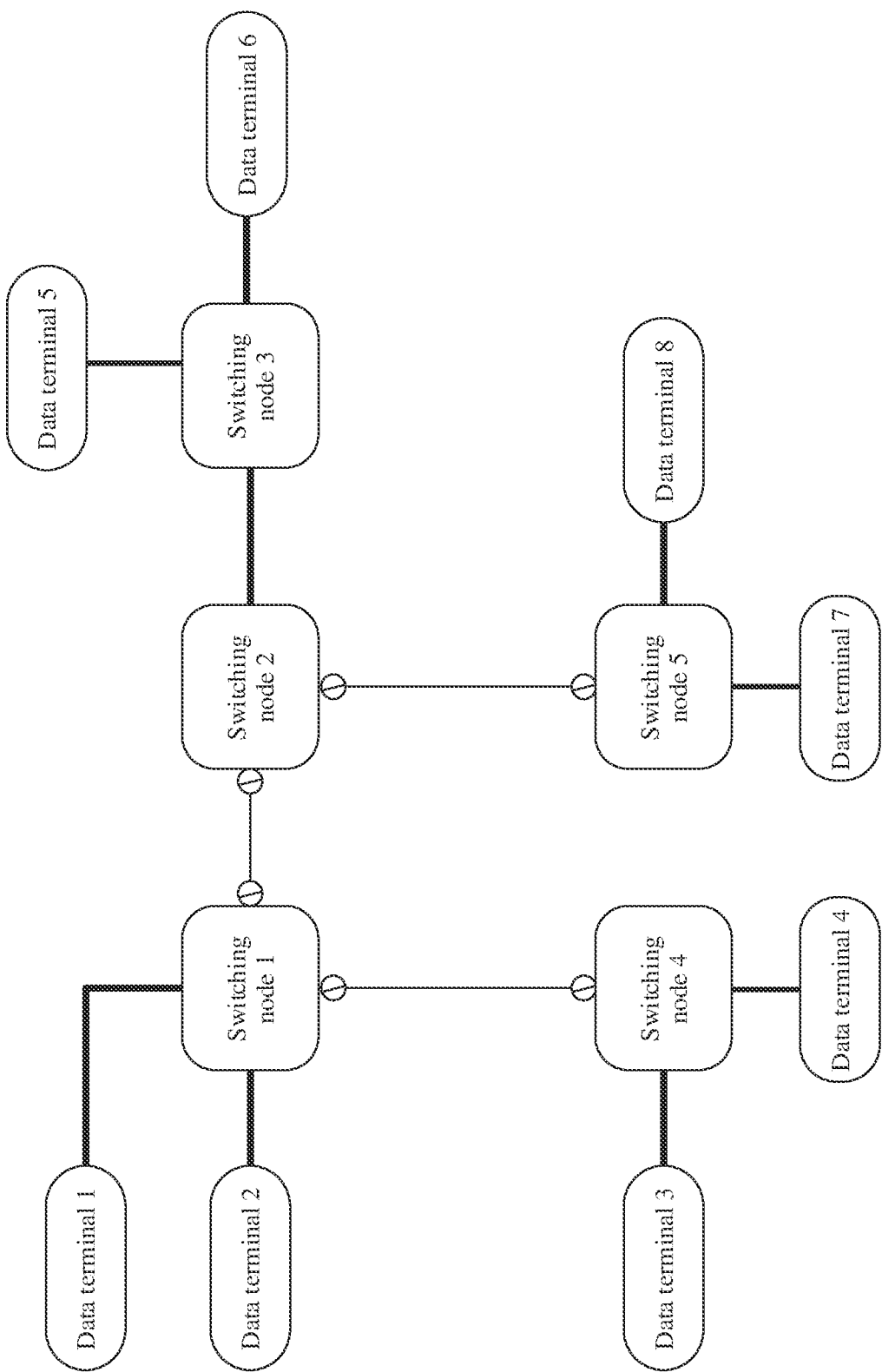
FIG. 2 is a schematic diagram of a network topology of TSN.

There are a plurality of network topology structures formed by the data terminal and the switching node, which may be configured based on an application scenario. FIG. 2 is a schematic diagram of a simple network topology structure of TSN, where a plurality of data terminals and switching nodes are included.

The TSN is based on layer 2 transmission. A TSN standard defines behavior of the data terminal and the switching node and a scheduling manner in which the switching node forwards a TSN stream, to implement reliable delay transmission. The switching node in the TSN uses a destination MAC address or another feature of the packet as an identifier of the TSN stream, and performs resource reservation and scheduling planning based on a delay requirement of the TSN stream, to ensure reliability and a transmission delay according to a generated scheduling policy.

Data terminals may be classified into a transmit end (talker) and a receive end (listener). A transmitter of the TSN stream (stream) is referred to as the transmit end (talker), and a receiver of the TSN stream is referred to as the receive end (listener). When the transmit end or the receive end sends a TSN stream requirement to the TSN, a TSN configuration is started. The TSN configuration includes a configuration of a switching node on a path from the transmit end to the receive end.

Optionally, the TSN may further include a configuration network element that is configured to implement the TSN configuration, for example, a centralized network configuration (CNC) network element or a centralized user configuration (CUC) network element.

Figure 3:
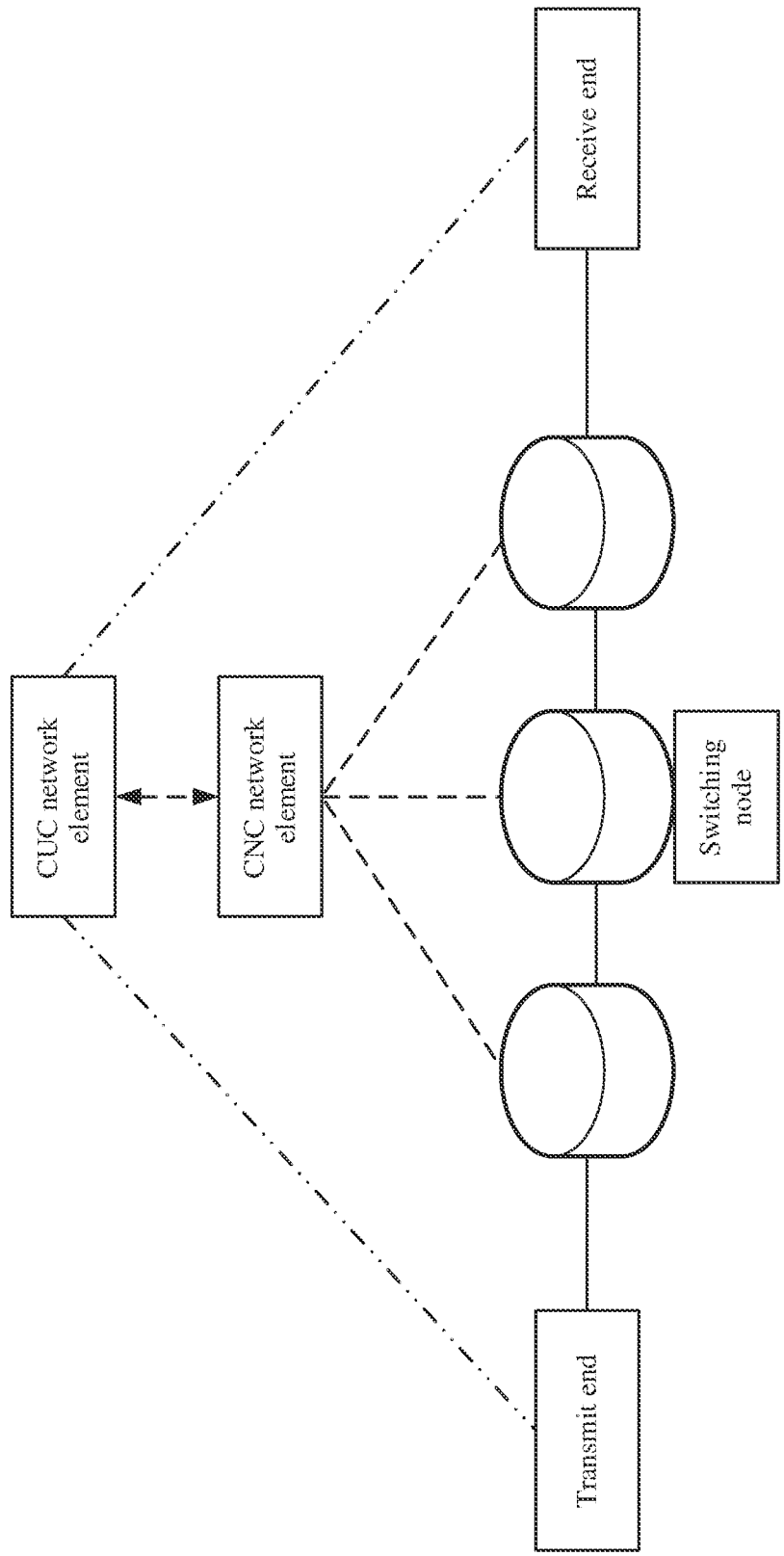
FIG. 3 is a schematic diagram of a centralized management architecture of TSN.

FIG. 3 is a schematic diagram of a centralized management architecture of TSN. The centralized management architecture is one of three architectures defined by 802.1qcc in a TSN standard. The centralized management architecture includes a transmit end, a receive end, a switching node, a CNC network element, and a CUC network element. It should be noted that a quantity of network elements and the network topology structure shown in FIG. 3 are merely examples. This is not limited in this embodiment of this application.

The switching node reserves a resource for a TSN stream according to a definition in the TSN standard, and schedules and forwards a data packet.

The CNC network element is responsible for managing a topology of a TSN user plane and information about the switching node, generating a transmission path of the TSN stream and processing policies on a data terminal and each switching node based on a stream creation request provided by the CUC network element, and then delivering a processing policy on the switching node to a corresponding switching node.

The information about the switching node may include port information and delay information of the switching node. Specifically, the port information of the switching node includes a port identifier of the switching node and an external transmission delay of the switching node, and the port information of the switching node may further include external topology information of a port of the switching node.

Ports of the switching node include an ingress port and an egress port for transmitting uplink and downlink data. The external topology information of the port of the switching node is used to indicate a connection relationship between the port of the switching node and a port of an external neighbor node.

The external transmission delay of the switching node is duration passed from a time point at which the switching node sends data from the egress port to a time point at which the data reaches an ingress port of a peer virtual switching node.

The delay information is used to indicate an internal transmission delay of the switching node, and the internal transmission delay of the switching node is duration passed from the ingress port to the egress port when data transmission is performed inside the switching node.

In this embodiment of this application, a 5G system may be used as a virtual switching node, and information about the virtual switching node also includes port information and delay information of the virtual switching node.

Specifically, ports of the virtual switching node are classified into an ingress port and an egress port for transmitting uplink and downlink data. Ingress ports of the virtual switching node include a port of UE and a port of a UPF, for example, a port (an uplink port) used by the UE to transmit uplink data and a port (a downlink port) used by the UPF to transmit downlink data. Egress ports of the virtual switching node include a port of the UE and a port of the UPF, for example, a port (a downlink port) used by the UE to transmit downlink data and a port (a uplink port) used by the UPF to transmit uplink data.

The port information of the virtual switching node includes identifiers of the ingress port and the egress port of the virtual switching node and an external transmission delay of the virtual switching node, and the port information of the virtual switching node may further include external topology information of a port of the virtual switching node.

In this embodiment of this application, the external transmission delay of the virtual switching node includes information about a transmission delay between a port of the UE and an external neighbor node and information about a transmission delay between a port of the UPF network element and an external neighbor node.

The external topology information of the port of the virtual switching node is used to indicate a connection relationship between the port of the virtual switching node and a port of the external neighbor node. In this embodiment of this application, the external topology information of the port of the virtual switching node includes external topology information, of the port of the UE, used to indicate a connection relationship between the port of the UE and the port of the external neighbor node and external topology information, of a port of the UPF network element, used to indicate a connection relationship between the port of the UPF network element and the port of the external neighbor node. For example, the UE has two neighbor nodes, a switch 1 and a switch 2, and external topology relationships of the two neighbor nodes may be shown in Table 1. An identifier of a neighbor node may be a MAC address of the neighbor node, and an identifier of a port may be a MAC address corresponding to the port, or may be identified in another manner.

The delay information is used to indicate an internal transmission delay of the TSN stream in the virtual switching node. The internal transmission delay in the virtual switching node is duration passed from the ingress port to the egress port when data transmission is performed inside the virtual switching node, that is, a transmission delay of the TSN stream between the UE and the UPF network element.

The processing policy on the switching node may include, for example, a port and a time slice for receiving and sending a packet. The time slice is time information of receiving and sending the packet by the switching node. For example, the packet is received within a period of time from t1 to t2.

TABLE 1

| Connection relationship 1: | Identifier of a switch 1 | Identifier of a port A of the switch 1 | 5G virtual switching node ID | Identifier of a port 1 of UE |
| Connection relationship 2: | Identifier of the switch 1 | Identifier of a port B of the switch 1 | 5G virtual switching node ID | Identifier of a port 2 of the UE |

The CUC network element is configured to obtain a TSN capability of a data terminal, that is, obtain a quantity of ports of the data terminal, a MAC address of each port, and an 802.1 capability supported by the port. On this basis, the CUC network element may collect a stream creation request of the data terminal, after performing matching on a stream creation request of a transmit end and a stream creation request of a receive end, request the CNC network element to create the TSN stream, and confirm a processing policy generated by the CNC network element. The performing matching on a stream creation request of a transmit end and a stream creation request of a receive end means that the transmit end and the receive end each send the stream creation request to the CUC network element, where the stream creation request includes some information, for example, a destination MAC address of a requested TSN stream, the CUC network element performs matching on the stream creation request and a destination MAC address of a TSN stream requested by a different data terminal. If the destination MAC addresses of TSN streams requested by two data terminals are the same, the TSN streams requested by the two data terminals are the same, the matching succeeds, and the TSN stream can be created. If destination MAC addresses of TSN streams requested by two data terminals are different, only the stream creation request of the transmit end or the receive end is available, and the TSN stream cannot be created.

It may be understood that the CNC network element and the CUC network element are control plane network elements in the TSN.

In addition to forwarding data or a packet, the switching node in the TSN further needs to have another function. For example, the switching node has a topology discovery function, determines a switch identifier and a switch port identifier, and supports a protocol such as a link layer discovery protocol (LLDP). For another example, the switching node may determine a transmission delay, and after detecting an internal transmission delay of the switching node, reports the detected transmission delay to the configuration network element.

Figure 4A:
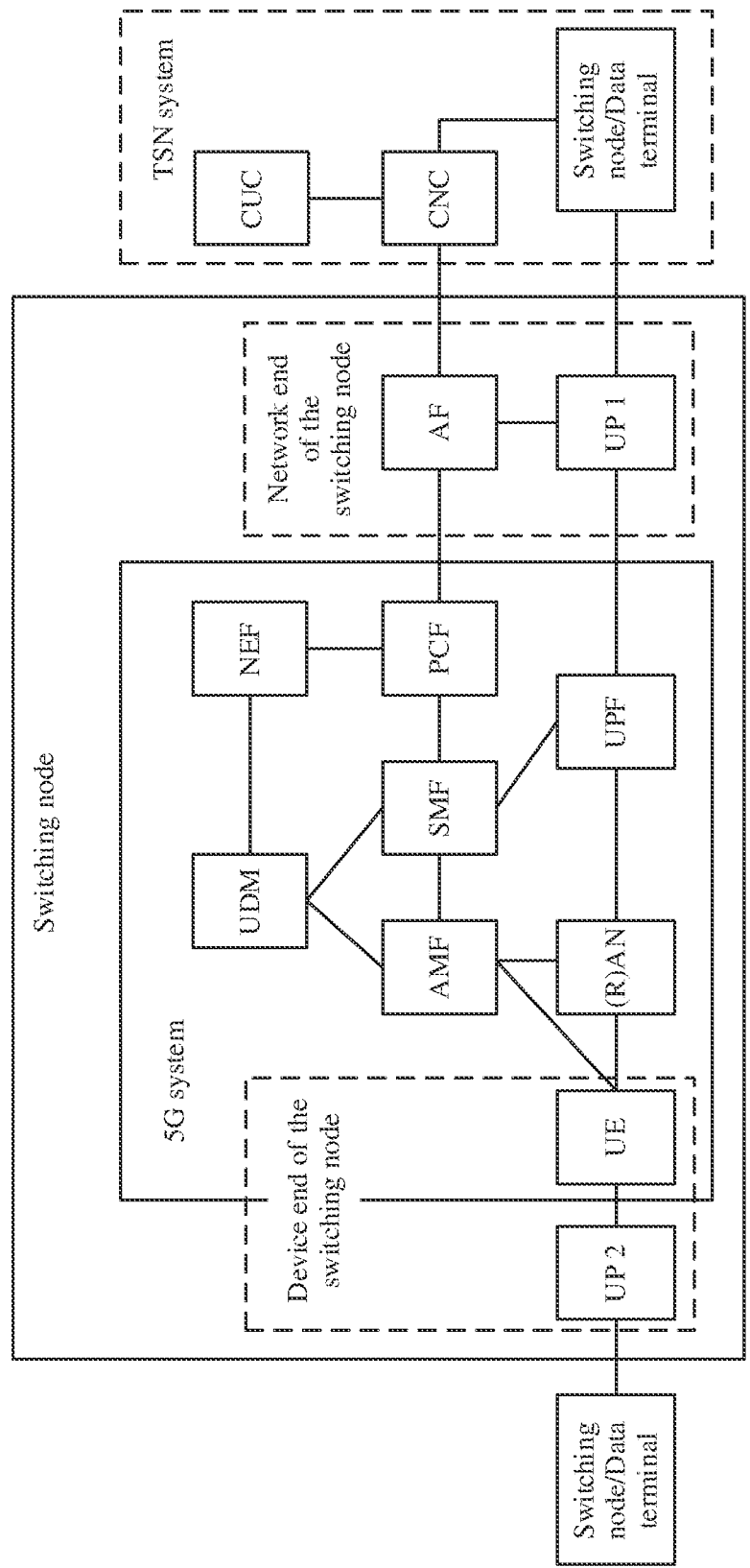
FIG. 4a is a schematic diagram of a network architecture according to an embodiment of this application.

FIG. 4a is a schematic diagram of a network architecture to which this application is applicable, where the network architecture integrates a 5th generation mobile communications (5G) system and TSN. Referring to the schematic diagram of the network architecture shown in FIG. 4a, a control plane of a TSN adaptation function is added to an AF network element, a user plane (UP) 1 of the TSN adaptation function is added to a UPF network element, and a UP 2 of the TSN adaptation function is added to UE. The AF network element, the UPF network element, the UE, and the 5G system jointly form a logical switching node, that is, a virtual switching node, which serves as a switching node in the TSN. Although the UPF and the UP 1, and the UE and the UP 2 are separately drawn in FIG. 4a, actually, the UP 1 and the UP 2 are logical functions of the user plane of the TSN adaptation function, and the UP 1 may be deployed on the UPF network element, or the UP 1 may be an internal function module of the UPF network element. Similarly, the UP 2 may be deployed on the UE, or the UP 2 may be an internal function module of the UE.

The TSN adaptation function refers to adapting a feature and information of a 5G network to information required in the TSN, and communicating with a network element in the TSN through an interface defined in the TSN.

The AF network element is used as a connection node between the 5G system and the TSN. The AF network element may interact with a CNC network element in the TSN, and provide information about the logical switching node for the CNC network element based on a requirement of the switching node in the TSN. The user plane of the TSN adaptation function provides necessary information for the control plane of the TSN adaptation function. In other words, the UP 1 may provide necessary information for the AF network element, for example, provide information about the switching node in the TSN, may identify TSN to which the CNC network element belongs, and may further provide a DNN of the TSN for a PCF network element in the 5G system.

Figure 4B:
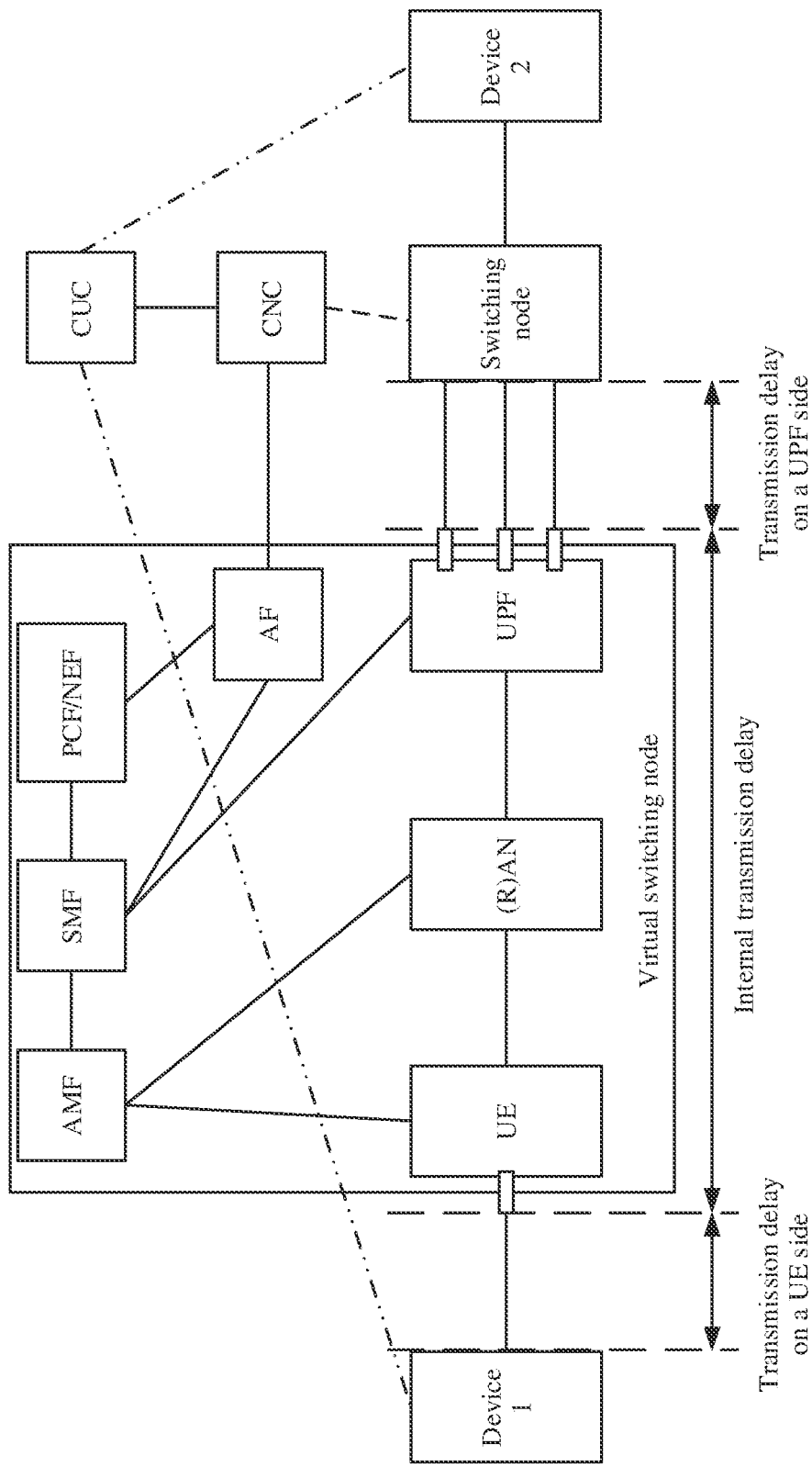
FIG. 4b is a schematic diagram of a network architecture according to an embodiment of this application.

FIG. 4b is a schematic diagram of another network architecture to which this application is applicable. In FIG. 4b, the user plane of the TSN adaptation function, that is, the UP 2 in FIG. 4a, is deployed on the UE or the user plane of the TSN adaptation function is an internal function module of the UE. The UP 2 is configured to, obtain port information of the UE, and send the port information of the UE to the AF network element through the control plane.

It should be noted that in the network frameworks shown in FIG. 4a and FIG. 4b, the SMF network element may interact with the AF network element through the PCF network element or the NEF network element, or may directly interact with the AF network element. This is not limited in this embodiment of this application.

Figure 4C:
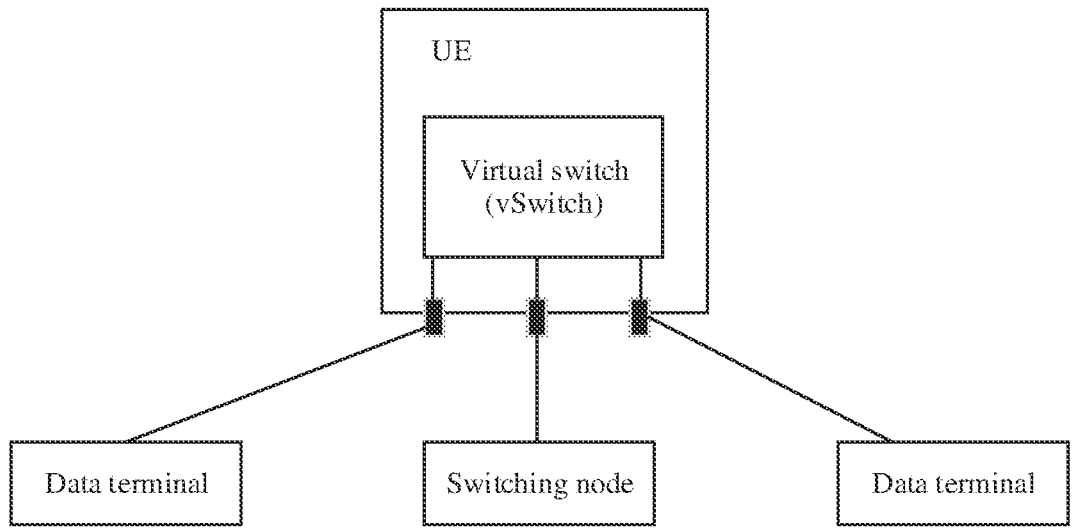
FIG. 4c is a schematic structural diagram of a terminal device according to an embodiment of this application.

FIG. 4c is a schematic structural diagram of UE. When a 5G system is virtualized as a switching node, a virtual switch (vSwitch) may be abstracted in the UE. The virtual switch is connected to different switching nodes or data terminals through various virtual interface cards (VIC), so that it can be ensured that different switching nodes or data terminals connected to the UE belong to different virtual local area networks (VLAN), and logical communication isolation can also be implemented through the virtual switch.

The port information of the UE may include a port identifier and information about a transmission delay between a port of the UE and an external neighbor node, and may further include external topology information of the port of the UE or a quantity of ports of the UE. The external topology information of the port of the UE is used to indicate a connection relationship between the port of the UE and a port of the neighbor node, and the information about the transmission delay between the port of the UE and the external neighbor node is used to indicate the transmission delay between the port of the UE and the port of the neighbor node.

It should be noted that the structure shown in FIG. 4c is merely an example. Actually, the port of the UE is not limited to a virtual port, and may alternatively be a logical port or a logical port. A type of the port of the UE is not limited in this embodiment of this application.

In FIG. 4b, the AF network element is a logical network element, or may be a component in another logical network element (for example, a component in the SMF network element), or may be another control plane function network element. A name of the AF network element is not limited herein. A device 1 and a device 2 may be equivalent to the data terminals in FIG. 2, or may be equivalent to the transmit end or the receive end in FIG. 3. The device 1 is connected to a port on a UE side, and the connection may be a physical link, or may be a virtual connection (for example, the device 1 is a processing unit of a device in which the UE is located). The device 1 may be another terminal device other than the UE, or may be a switching node. The device 1 shown in FIG. 4b is used as a terminal device to interact with a CUC network element. If the device 1 is a switching node, the device 1 interacts with a CNC network element (the device 1 is similar to a switching node that is connected to the UPF network element and that is shown in FIG. 4b). The device 2 shown in FIG. 4b is used as a terminal device to interact with the CUC network element. The device 2 is not directly connected to a physical port of the UPF network element. There is further a switching node between the device 2 and the virtual switching node. The switching node may be an actually existing switching node in the TSN, for example, may be a switching node in a data network (DN), or may be another virtual switching node. Alternatively, the device 2 may be directly connected to the physical port of the UPF network element.

In FIG. 4a and FIG. 4b, a transmission delay between the port on the UE side and the physical port on a UPF side is used as an internal transmission delay of the virtual switch node. For a physical switching node that supports a TSN protocol, an internal transmission delay is directed at a port pair, and different port pairs may have different internal transmission delays. For example, there is an internal transmission delay 1 between an ingress port 1 and an egress port 1 of a switch, there is an internal transmission delay 2 between the ingress port 1 and an egress port 2 of the switch, and values of the internal transmission delay 1 and the internal transmission delay 2 may be different.

It should be noted that in the network architectures shown in FIG. 4a and FIG. 4b, only a network architecture in which the 5G system and the TSN are integrated is used as an example. In the following descriptions, a communication method in the embodiments of this application is described based on the schematic diagrams of the network architectures shown in FIG. 4a and FIG. 4b. Actually, integration of another communications system and the TSN is not limited in the embodiments of this application. When the another communications system is virtualized as a switching node in the TSN, a network element (for example, a network element that can implement a function of a terminal device, a session management network element, an access and mobility management network element, or the like in the embodiments of this application) that can implement a related function is disposed in the another communications system, to ensure that the another communications system has a function of the switching node. For a specific implementation, refer to the embodiments of this application.

Based on the schematic diagrams of the network architectures shown in FIG. 4a and FIG. 4b, the 5G system is virtualized as the switching node in the TSN, and may be considered as the virtual switching node in the TSN. In addition to data forwarding, the 5G system further needs to have a function of reporting port information or a transmission delay. To enable the 5G system to have the foregoing function, the embodiments of this application provide a communication method. In the embodiments of this application, UE may report port information of the UE to an SMF network element after receiving a request, or may actively report port information of the UE to the SMF network element. After obtaining the port information of the UE, the SMF network element may send the port information of the UE to the CNC network element. After receiving the port information of the UE, the CNC network element may perform related configuration, for example, configuration of a TSN stream. According to the method provided in the embodiments of this application, the 5G system has a function of a switching node, and may report the port information of the UE to the CNC, to ensure that normal and relatively efficient end-to-end data transmission can be subsequently implemented when the 5G system is used as the switching node.

Figure 5:
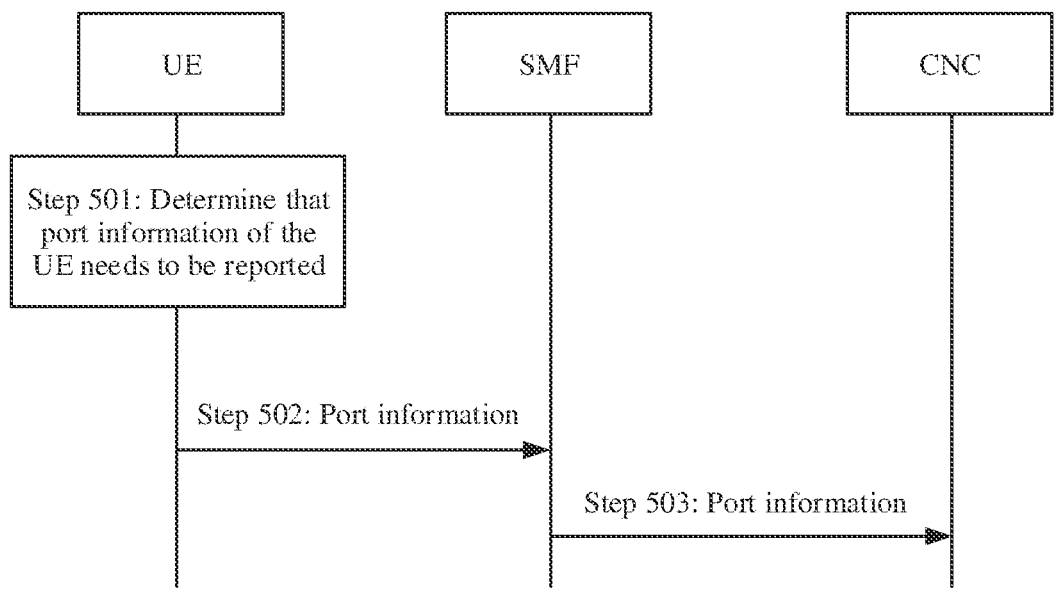
FIG. 5 to FIG. 11 each are a schematic diagram of a communication method according to an embodiment of this application.

An example in which a terminal device is UE, a session management network element is an SMF network element, and a centralized network configuration network element is the CNC network element is used for description. Actually, types and names of the terminal device, the session management network element, and the centralized network configuration network element are not limited in an embodiment of this application, and all devices that can implement corresponding functions of the terminal device, the session management network element, and the centralized network configuration network element are applicable to this embodiment of this application. FIG. 5 shows a communication method provided in this embodiment of this application. The method includes the following steps.

Step 501: The UE determines that port information of the UE needs to be reported.

The UE may determine whether a case in which the port information of the UE needs to be reported is met. There are many cases in which the port information of the UE needs to be reported. Examples are shown as follows.

Case 1: The UE supports a TSN service.

The UE may be configured to transmit a TSN stream. For example, the UE may be connected to a switching node or a data terminal in the TSN, and may also transmit data to another switching node or data terminal by using a 5G system.

If the UE supports the TSN service, when registering with the 5G system, the UE may send the port information of the UE to the SMF network element in advance. For example, the UE sends the registration request including the port information of the UE to the AMF network element and may send the port information of the UE to the SMF network element through the AMF network element in a subsequent PDU session establishment process.

Case 2: A PDU session corresponding to a TSN service needs to be established. In other words, the PDU session that needs to be established is used to carry a TSN stream.

The UE determines, in many manners, that the PDU session needs to carry the TSN stream. For example, when the UE needs to establish a PDU session to transmit data for a TSN-related application (APP), the UE may determine, based on a preconfigured correspondence between the APP and a data network name (DNN), the DNN corresponding to the APP, and determine, based on a preconfigured DNN set supporting the TSN, whether the DNN (which may also be considered as a DNN of the PDU session that needs to be initiated) corresponding to the APP supports the TSN. If the DNN supports the TSN, the PDU session that needs to be initiated is a session that needs to carry a TSN stream or a session that needs to communicate with the TSN, and the UE may determine that the PDU session needs to carry the TSN stream, in other words, the PDU session is a session that needs to communicate with the TSN. In this case, the preconfigured DNN set supporting the TSN is locally stored in the UE, so that the UE determines that the PDU session that needs to be initiated is the session that needs to carry the TSN stream or the session that needs to communicate with the TSN.

In this embodiment of this application, a meaning expressed by that the PDU session is a session that needs to carry a TSN stream is the same as a meaning expressed by that the PDU session is a session that needs to communicate with the TSN, and there is no difference. In this embodiment of this application, the two expressions are used interchangeably.

In other words, when initiating a PDU session establishment procedure, the UE may determine that the PDU session that needs to be established needs to carry the TSN stream.

Case 3: A currently established PDU session needs to carry a TSN stream.

The UE determines, in many manners, that the currently established PDU session needs to carry the TSN stream. For example, the UE may determine, based on a DNN of the currently established PDU session, that the currently established PDU session needs to carry the TSN stream. A manner in which the UE may determine, based on the DNN of the currently established PDU session, that the currently established PDU session needs to carry the TSN stream is the same as the manner in which the UE determines, based on the DNN of the PDU session, that the PDU session needs to carry the TSN stream in the case 2. Details are not described herein again.

For another example, the UE may alternatively determine, through an indication message of another network element, that the currently established PDU session needs to carry the TSN stream. In a PDU session establishment procedure, the UE sends a PDU session establishment request to the SMF network element through the AMF network element, and the SMF network element determines, based on information (for example, the DNN) carried in the PDU session establishment request sent by the UE, that the currently established PDU session may be used to carry the TSN stream, and then may send indication information to the UE, where the indication information is used to indicate that the currently established PDU session needs to carry the TSN stream. To reduce signaling, the indication message may be carried in the PDU session establishment acknowledgment message, and the indication message may be an information element in the PDU session establishment acknowledgment message.

The information carried in the PDU session establishment request sent by the UE may be the DNN of the PDU session. The SMF network element may determine, based on a preconfigured DNN set supporting a TSN service and by using the DNN carried in the PDU session establishment request, whether the DNN supports the TSN service. After determining that the DNN supports the TSN service, the SMF network element determines that the currently established PDU session needs to carry the TSN stream. In this case, the preconfigured DNN set supporting the TSN is locally stored in the SMF network element, or may be stored in another device, and the SMF network element conveniently obtains the preconfigured DNN set supporting the TSN.

Case 4: An established PDU session needs to carry a TSN stream.

The UE determines, in many manners, that the established PDU session needs to carry the TSN stream. For example, after receiving a PDU session modification request from the SMF network element, the UE determines a DNN of the PDU session based on the PDU session identifier carried in the PDU session modification request. Then, the UE determines, based on the DNN of the PDU session, that the PDU session needs to carry the TSN stream. For a manner in which the UE determines, based on the DNN of the PDU session, that the PDU session needs to carry the TSN stream, refer to the manner in which the UE may determine, based on the DNN of the currently established PDU session, that the currently established PDU session needs to carry the TSN stream in the case 3. Details are not described herein again.

For another example, the UE may alternatively determine, through an indication message of another network element, that the established PDU session needs to carry the TSN stream. In a PDU session modification procedure, the SMF network element may determine, based on the DNN of the PDU session that needs to be modified, that the PDU session that needs to be modified needs to carry the TSN stream. For a manner in which the SMF network element determines, based on the DNN of the PDU session that needs to be modified, that the PDU session that needs to be modified needs to carry the TSN stream, refer to the manner in which the SMF network element may determine, based on the DNN of the currently established PDU session, that the currently established PDU session needs to carry the TSN stream in the case 3. Details are not described herein again.

After determining that the PDU session that needs to be modified needs to carry the TSN stream, the SMF network element sends a PDU session modification request to the UE through the AMF network element. The PDU session modification request includes an indication message, and the indication message may be used to indicate that the established PDU session needs to carry the TSN stream. After receiving the PDU session modification request, the UE may determine, based on the indication message, that the established PDU session needs to carry the TSN stream.

It should be noted that, the four cases are merely described separately in the foregoing descriptions. When the UE determines that the port information of the UE needs to be reported, the UE may determine that a part or all of the foregoing cases are conformed to. For example, the UE may conform to only one of the foregoing four cases, or may conform to two or more of the foregoing four cases. For example, the UE conforms to the case 1 and the case 2, or the UE conforms to the case 1 and the case 3. Another case in which the port information of the UE needs to be reported is not limited in this embodiment of this application. Any case in which the UE needs to report the port information of the UE is applicable to this embodiment of this application.

Step 502: The UE sends the port information of the UE to the SMF network element, where the port information of the UE includes a port identifier of the UE and information about a transmission delay between a port of the UE and an external neighbor node.

Optionally, the port information of the UE includes external topology information of the port of the UE.

After determining that the foregoing four cases are met, the UE may send the port information of the UE to the SMF network element.

If the UE conforms to the case 1, the UE may send the registration request including the port information of the UE to the AMF network element in a registration initiation procedure, and the AMF network element may store the port information of the UE. When the PDU session needs to be established, the AMF network element may send the PDU session registration request including the port information of the UE to the SMF network element (which is referred to as a manner 1 for short).

If the UE conforms to the case 2 or the case 3, the UE may send the port information of the UE to the SMF network element in the manner 1. Alternatively, the UE may send the PDU session establishment request including the port information of the UE to the SMF network element through the AMF network element in a session establishment initiation procedure (which is referred to as a manner 2 for short). Alternatively, the UE may include the port information of the UE in a PDU session establishment acknowledgment response, and send the PDU session establishment acknowledgment response to the SMF network element through the AMF network element (which is referred to as a manner 3 for short).

If the UE conforms to the case 4, in the session modification procedure, the UE may further include the port information of the UE in a PDU session modification response, and send the PDU session modification response to the SMF network element through the AMF network element (which is referred to as a manner 4 for short).

If the UE conforms to the case 1 and the case 2, the UE may report the port information of the UE in the manner 1 or the manner 2, or may report the port information of the UE in both the manner 1 and the manner 2, to be specific, the UE includes the port information of the UE in both the registration request and the session establishment request.

If the UE conforms to the case 1 and the case 4, the UE may report the port information of the UE in the manner 1, or may report the port information of the UE in the manner 4, or may report the port information of the UE in both the manner 1 and the manner 4, to be specific, the UE includes the port information of the UE in both the registration request and the session modification response.

The foregoing manner in which the UE sends the port information of the UE to the SMF network element is merely an example, and is not limited in this embodiment of this application. For example, if the UE conforms to the case 2, the manner 2 may not be used. In the PDU session modification procedure, the UE then sends the port information of the UE to the SMF network element through the PDU session modification response. Alternatively, the UE may send the port information of the UE to the SMF network element through separate signaling, or may send the port information of the UE to the SMF network element through a user plane. For example, the UE may send the port information to the UPF network element, and the UPF network element forwards the port information to the SMF network element. Any manner in which the SMF can obtain the port information of the UE is applicable to this embodiment of this application.

Before the UE sends the port information of the UE to the SMF network element, the UE needs to determine the port information of the UE. The UE may actively determine the port information of the UE in advance, and then send the determined port information of the UE to the SMF network element after determining that the port information of the UE needs to be reported to the SMF. If the UE determines that the UE supports the TSN service, the UE may actively determine the port information in advance. For example, the UE may autonomously check the external topology information of the port of the UE and/or the information about the transmission delay between the port of the UE and the external neighbor node.

Before the UE sends the port information of the UE to the SMF network element, the SMF network element may alternatively send a first indication message to the UE, to indicate the UE to determine the port information of the UE. After receiving the first indication message, the UE may determine the port information of the UE. If the UE has detected the port information of the UE in advance, and has locally stored the port information of the UE, the UE may obtain the locally stored port information of the UE. If the UE does not determine the port information of the UE in advance, for example, the UE does not detect the external topology information of the port of the UE and/or the information about the transmission delay between the port of the UE and the external neighbor node, after receiving the first indication message, the UE may determine the port information of the UE. In other words, the UE detects the external topology information of the port of the UE and/or the information about the transmission delay between the port of the UE and the external neighbor node to determine the port information of the UE.

Step 503: After the SMF network element obtains the port information of the UE, the SMF network element sends the port information of the UE to the CNC network element.

After the SMF network element obtains the port information of the UE, the SMF network element may directly send the port information of the UE to the CNC network element. Alternatively, after determining a transmission delay between the UE and the UPF network element, the SMF network element sends both the port information of the UE and the transmission delay between the UE and the UPF network element to the CNC network element.

The SMF network element determines the transmission delay between the UE and the UPF network element in the PDU session establishment procedure or the PDU session modification procedure.

The following describes a manner in which the SMF network element determines the transmission delay between the UE and the UPF network element.

Manner 1: In the PDU session modification procedure, a QoS flow needs to be reestablished for the PDU session.

After receiving the capability information obtaining request of the CNC network element, the PCF network element needs to determine, based on information that is about the TSN stream and that is included in the capability information obtaining request, that the established PDU session needs to be modified and a current policy and charging control rule of the PDU session needs to be updated. In other words, policy information needs to be updated. After updating the policy information, the PCF network element sends, to the SMF network element, a session policy update notification that carries updated policy information, and the SMF network element may obtain the updated policy information from the session policy update notification.

The session policy update notification includes a part or all of the PDU session identifier, an identifier of the UE, or the updated policy information.

The PDU session identifier is used to identify a PDU session that needs to be modified. The identifier of the UE is an identifier of UE that has established a PDU session, and may be a subscription permanent identifier (SUPI). This is not limited in this embodiment of this application.

After receiving the updated policy information from the PCF network element, the SMF network element initiates the PDU session modification procedure.

The updated policy information includes a new policy and charging control rule (PCC rule), and the policy and charging control rule includes at least QoS parameters such as a service data flow template corresponding to the TSN stream and a 5QI.

The SMF network element determines a QoS flow of the TSN stream according to the PCC rule. The QoS flow may be an existing established QoS flow, or may be a QoS flow newly established for the TSN stream when the SMF network element determines, according to the PCC rule, that an existing QoS flow cannot match a QoS parameter requirement in the PCC rule.

One PDU session may usually include one or more QoS flows. One QoS flow may carry one or more service streams transmitted between the UE and the UPF network element. The TSN stream herein is a type of service stream.

Nodes such as the UPF network element, a RAN, and the UE in the 5G system process and forward a service stream carried in a QoS flow based on a QoS parameter corresponding to the QoS flow. When service streams carried in a same QoS flow are transmitted in a 3GPP system, that is, transmitted between the UE and the UPF network element, forwarding rules are the same. In other words, one QoS flow corresponds to one UE and one UPF network element.

After receiving the session policy update notification, the SMF network element initiates the PDU session modification procedure to reestablish the QoS flow for the PDU session of the UE. In other words, the SMF network element needs to establish the QoS flow for the UE. In a procedure of establishing the QoS flow, the SMF network element may determine the transmission delay between the UE and the UPF network element corresponding to the QoS flow.

Specifically, after receiving the session policy update notification, the SMF network element obtains the updated policy information, and determines the transmission delay according to the PCC rule in the updated policy information.

The PCC rule includes a QoS parameter required for transmitting the TSN stream, and the QoS parameter includes the 5QI.

Each 5QI has a corresponding packet delay budget (PDB). The PDB is a maximum allowable delay of a QoS flow transmitted between the UE and the UPF network element, and means that a transmission delay of a service stream carried in the QoS flow in the 5G system does not exceed the PDB.

The SMF network element determines the transmission delay based on the packet delay budget. For example, the SMF network element may use the PDB as the transmission delay.

Manner 2: In the PDU session establishment procedure, a QoS flow needs to be established for the PDU session.

The SMF network element establishes the PDU session after receiving a policy notification from the PCF network element.

The policy notification includes a part or all of the PDU session identifier, an identifier of the UE, or policy information.

Descriptions of the PDU session identifier, the identifier of the UE, and the policy information is similar to those in the manner 1, and details are not described herein again. A manner in which the SMF network element determines the transmission delay is similar to the manner 1. For details, refer to the manner 1. A difference lies only in that in the manner 1, the policy information is updated, and in the manner 2, the policy information is generated for establishing the PDU session.

It should be noted that, regardless of the PDU session establishment process or the PDU session modification process, the QoS flow needs to be established for the UE. In a process of establishing the QoS flow of the UE, the SMF network element may determine the transmission delay.

The SMF network element sends the transmission delay to the CNC network element. After obtaining the transmission delay, the CNC network element determines, based on the transmission delay and port information and delay information that are reported by another switching node, a configuration of a scheduling and forwarding policy for the another switching node, to ensure that delay and bandwidth requirements of the TSN stream are met.

After the SMF network element determines the port information of the UE and the transmission delay, the SMF network element may separately send the port information of the UE and the transmission delay. For example, the SMF network element sends the port information of the UE to the CNC network element after obtaining the port information of the UE from the UE, and sends the transmission delay to the CNC network element after determining the transmission delay. In other words, the SMF network element may send the port information of the UE and the transmission delay at different time points. The SMF network element may alternatively send both the port information of the UE and the transmission delay to the SMF network element.

When sending the port information of the UE, the SMF network element may alternatively send the port information of the UE for a plurality of times, that is, send only a part of the port information of the UE each time. For example, the SMF network element may first send the port identifier of the UE, the information about the transmission delay between the UE and the external neighbor node, and a quantity of ports, and then send the external topology information of the port of the UE after the external topology information of the port of the UE is detected based on an indication of the SMF network element.

As mentioned in step 501, the CNC network element needs to learn of information about the virtual switching node. When sending the port information of the UE or the transmission delay to the CNC network element, the SMF network element may use the port information of the UE as port information of the virtual switching node, use the transmission delay as delay information in the information about the virtual switching node, and send the information about the virtual switching node to the CNC network element.

It should be noted that, from a perspective of a device to which a port of the virtual switching node belongs, in addition to the port information of the UE, the port information of the virtual switching node may further include port information of the UPF.

The port information of the UPF network element is a port identifier of the UPF network element and information about a transmission delay between a port of the UPF network element and an external neighbor node. The port information of the UPF may further include external topology information of the port of the UPF. The external topology information of the port of the UPF network element is used to indicate a connection relationship between the port of the UPF network element and a port of the neighbor node. A manner of obtaining the port information of the UPF network element is not limited, and any manner in which the SMF network element can obtain the port information of the UPF network element is applicable to this embodiment of this application.

In the port information of the virtual switching node, only an ingress port and an egress port through which the virtual switching node transmits data need to be marked, and there is no need to specify that a port is the port of the UE or the port of the UPF network element. In other words, the CNC network element only needs to determine, by using the port information of the virtual switching node, the ingress port and the egress port through which the virtual switching node transmits the data. Correspondingly, in the delay information of the virtual switching node, only an internal transmission delay of the virtual switching node needs to be marked, and there is no need to specify the transmission delay between the UE and the UPF network element. In other words, an internal structure of the virtual switching node is invisible to the CNC network element.

When sending the port information of the UE and the transmission delay to the CNC network element, the SMF network element needs to convert the port information of the UE and the transmission delay into the information about the virtual switching node, and then sends the information about the virtual switching node to the CNC network element.

Optionally, the SMF network element may send the information about the virtual switching node to the CNC network element through the AF network element.

In a possible implementation, the SMF network element may send the port information of the UE and the transmission delay to the AF network element, and the AF network element converts the port information of the UE and the transmission delay into the information about the virtual switching node, and then sends the information of the virtual switching node to the CNC network element.

In the embodiment shown in FIG. 5, the SMF network element may use the port information of the UE and the transmission delay as the information about the virtual switching node, and send the information about the virtual switching node to the CNC network element.

If a PDU session anchor (PSA) in the 5G system, for example, an anchor UPF network element, changes, the virtual switching node is caused to change to another virtual switching node. Therefore, the SMF network element needs to notify the CNC network element that the virtual switching node is updated, and may further send updated information about the virtual switching node to the CNC network element.

Figure 6:
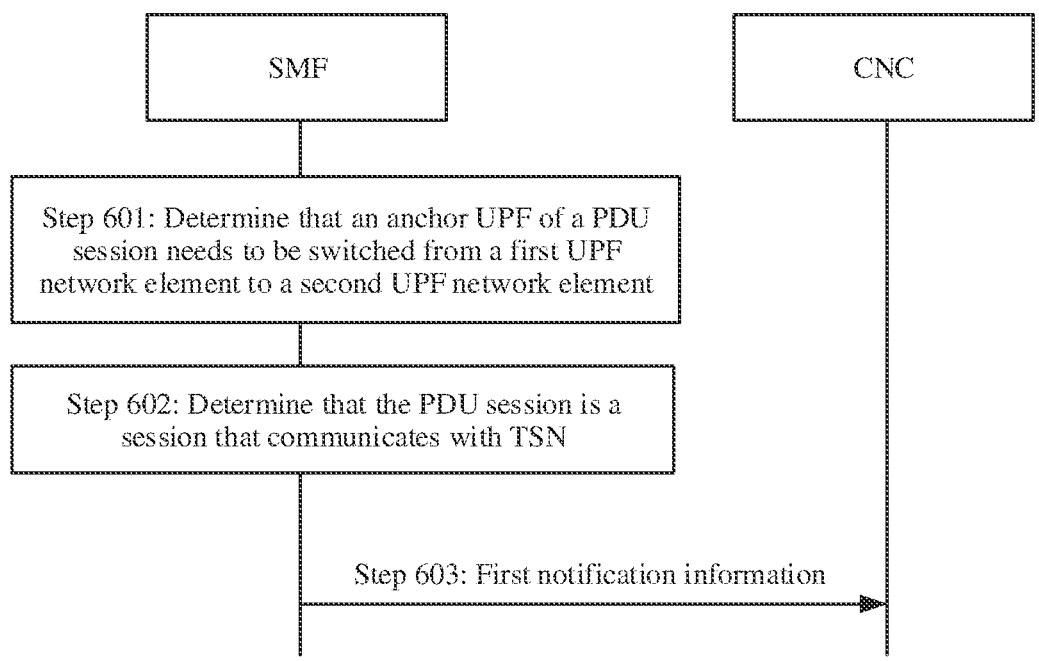

Based on the network architectures shown in FIG. 4a and FIG. 4b, an example in which a session management network element is an SMF network element and a centralized network configuration network element is the CNC network element is used for description. Actually, types and names of a terminal device, the session management network element, and the centralized network configuration network element are not limited in an embodiment of this application, and all devices that can implement corresponding functions of the session management network element and the centralized network configuration network element are applicable to this embodiment of this application. FIG. 6 shows a communication method provided in this embodiment of this application. The method includes the following steps.

Step 601: The SMF network element determines that an anchor UPF network element of a PDU session of the UE needs to be switched from a first UPF network element to a second UPF network element.

The anchor UPF network element is the UPF network element terminating an N6 interface. There are many cases in which the anchor UPF network element changes. For example, the UE moves, and consequently, a current anchor UPF network element is not suitable for continuing to provide a service for the UE. For example, a transmission path of a current anchor UPF network element is not an optimal path, and the anchor UPF network element needs to be switched. For another example, a current anchor UPF network element is faulty and cannot continue to provide a service, and the anchor UPF network element needs to be switched. This is not limited in this embodiment of this application.

When the anchor UPF network element changes, the SMF network element is triggered to reselect an anchor UPF network element of the PDU session for the UE.

If the anchor UPF of the PDU session of the UE is switched from the first UPF network element to the second UPF network element, the virtual switching node changes. This is because ports of a virtual switch include a port on a UE side and a port on a UPF network element side, which may be respectively used as an egress port and an ingress port of the virtual switch or an ingress port and an egress port of the virtual switch. For the virtual switch, the port on the UPF network element side is fixed. However, because one UPF network element may dynamically establish user plane connections to a plurality of UEs, the port on the UE side is variable. When new UE establishes a user plane connection to the UPF network element, a quantity of ports on the UE side of the virtual switch corresponding to the UPF network element is increased. When a user plane connection between the UE and the UPF network element is released, for example, when a better UPF network element provides a service for the UE due to movement of the UE, a quantity of ports on the UE side of the virtual switch corresponding to the UPF network element is reduced. If an anchor UPF network element in a 5G system changes, it means that a transmission path of a PDU session, a QoS flow carried in the PDU session, and a TSN stream carried in the QoS flow is switched from one UPF network element to another UPF network element. For the QoS flow or the TSN stream, a UPF network element corresponding to the QoS flow or the TSN stream changes. In other words, a virtual switching node used to transmit the QoS flow or the TSN stream changes. It may be understood that one anchor UPF network element corresponds to one virtual switching node. In this embodiment of this application, a virtual switching node corresponding to the first UPF network element is a first virtual switching node, that is, a virtual switching node before UPF switching. A virtual switching node corresponding to the second UPF network element is a second virtual switching node, that is, a virtual switching node after UPF switching.

Step 602: The SMF network element determines that the PDU session is a session that communicates with TSN.

The SMF network element determines, based on a DNN of the PDU session and a DNN set that is preconfigured in the SMF network element and that supports a TSN service, that the DNN of the PDU session supports the TSN service. After determining that the DNN supports the TSN service, the SMF network element determines that the PDU session is the session that communicates with the TSN.

Step 603: The SMF network element sends a first notification message to the CNC network element, where the first notification message is used to notify the CNC network element that port information of the first virtual switching node and/or port information of the second virtual switching node are/is updated.

The first notification message may be used to notify the CNC network element that only the port information of the second virtual switching node is updated, or may be used to notify the CNC network element that only the port information of the first virtual switching node is updated, or may be used to notify the CNC network element that the port information of the first virtual switching node and the port information of the second virtual switching node are updated.

When the anchor UPF is switched from the first UPF network element to the second UPF network element, the UE is no longer connected to the first UPF network element, but is connected to the second UPF network element. A port of the UE is removed from a port on a UE side in the first virtual switching node. To be specific, after the anchor UPF network element is switched, a port of the first virtual switching node should not include port information of the UE. However, the port of the UE is added to a port on a UE side in the second virtual switching node. To be specific, after the anchor UPF network element is switched, the port information of the second virtual switching node should include the port information of the UE. Clearly, after the anchor UPF network element is switched, both the port information of the first virtual switching node and the port information of the second virtual switching node should change, and need to be correspondingly updated.

The SMF network element may update the port information of the first virtual switching node and the port information of the second virtual switching node based on the port information of the UE.

For the port information of the first virtual switching node, the port information of the UE needs to be removed, and the port information of the first virtual switching node from which the port information of the UE is removed is updated port information of the first virtual switching node. For the port information of the second virtual switching node, the port information of the UE needs to be added, and the port information of the second virtual switching node to which the port information of the UE is added is updated port information of the second virtual switching node.

It should be noted that delay information of the virtual switching node is an internal transmission delay of the virtual switching node, and is determined according to a PCC rule of the QoS flow. Before and after the UPF network element is switched, the PCC rule of the QoS flow does not change, in other words, the delay information of the virtual switching node is not updated. In this embodiment of this application, delay information of the first virtual switching node and delay information of the second virtual switching node may not be updated.

The first notification message is used to notify, in many manners, the CNC network element that the port information of the virtual switching node (the first virtual switching node and/or the second virtual switching node) is updated. This is not limited in this embodiment of this application. For example, a type of the first notification message is a type of a message used to notify that the port information of the virtual switching node changes, the first notification message carries an identifier of the virtual switching node, and the first notification message may be used to indicate that the port information of the virtual switching node is updated. The foregoing manner is merely an example for description, and any manner in which the CNC network element may be notified that the port information of the virtual switching node (the first virtual switching node and/or the second virtual switching node) is updated is applicable to this embodiment of this application.

The PDU session carries a TSN stream before the UPF network element is switched. In this case, the first notification message may be further used to notify that the virtual switching node that transmits the TSN stream needs to change from the first virtual switching node to the second virtual switching node.

The first notification message is used to notify, in many manners, that the virtual switching node that transmits the TSN stream needs to change from the first virtual switching node to the second virtual switching node. For example, a type of the first notification message is a type of a message used to notify that the virtual switching node of the TSN stream is switched, the first notification message carries an identifier of the first virtual switching node and an identifier of the second switching node, and the first notification message may be used to indicate that the virtual switching node of the TSN stream changes from the first virtual switching node to the second virtual switching node. The foregoing manner is merely an example for description, and any manner of notifying that the virtual switching node that transmits the TSN stream needs to change from the first virtual switching node to the second virtual switching node is applicable to this embodiment of this application.

The first notification message may further carry some port information, so that the CNC network element can update port information of a corresponding virtual switching node. Specifically, the first notification message may carry a part or all of the following messages.

Message 1: the identifier of the second virtual switching node and the updated port information of the second virtual switching node.

Message 2: the identifier of the first virtual switching node and the updated port information of the first virtual switching node.

Message 3: the identifier of the second virtual switching node and port information used by the second virtual switching node to transmit the TSN stream.

For the message 3, because not all ingress ports and egress ports on the second virtual switching node may be ports used to transmit the TSN stream, the first notification message may carry only port information that needs to be updated and that is used to transmit the TSN stream. For example, the first notification message may carry information about an uplink port that is of the UE and that is used to transmit the TSN stream or information about a downlink port that is of the UE and that is used to transmit the TSN stream. Optionally, the first notification message may further carry information about an uplink port that is of the second UPF network element and that is used to transmit the TSN stream or information about a downlink port that is of the second UPF network element and that is used to transmit the TSN stream.

When the first notification message is further used to notify that the virtual switching node of the TSN stream needs to change from the first virtual switching node to the second virtual switching node, the first notification message may further carry an identifier of the TSN stream.

The first notification message is used to notify the CNC network element that the port information of the virtual switching node (the first virtual switching node and/or the second virtual switching node) is updated. After receiving the first notification message, the CNC network element may learn and determine that the port information of the corresponding virtual switching node is updated, and may mark the port information of the corresponding virtual switching node as "updated".

For example, the first notification message is used to notify the CNC network element that the port information of the second virtual switching node is updated. After receiving the first notification message, the CNC network element may learn and determine that the port information of the first virtual switching node is updated, and may mark the port information of the first virtual switching node as "updated".

In this case, if the first notification message further carries updated port information, the CNC network element may further update the port information of the corresponding virtual switching node. For example, if the first notification message may carry the identifier of the second virtual switching node and the updated port information of the second virtual switching node, the CNC network element may update the port information of the second virtual switching node to the port information carried in the first notification message.

After the CNC network element learns that the port information of the first virtual switching node and/or the port information of the second virtual switching node are/is updated, if the PDU session subsequently carries the TSN stream, the CNC network element may further determine, based on the updated port information of the first virtual switching node and/or the updated port information of the second virtual switching node, whether the transmission path of the TSN stream needs to include the first virtual switching node or the second virtual switching node, so that the TSN stream is subsequently reconfigured.

If the first notification message is further used to notify that the virtual switching node of the TSN stream needs to change from the first virtual switching node to the second virtual switching node, after receiving the first notification message, the CNC network element may replace the virtual switching node of the TSN stream from the first virtual switching node with the second virtual switching node.

The CNC network element may further reconfigure the transmission path for the TSN stream based on the first notification message.

Because the virtual switching node of the TSN stream changes from the first virtual switching node to the second virtual switching node, to ensure that the TSN stream can be normally transmitted, the transmission path needs to be reconfigured for the TSN stream.

That the CNC network element reconfigures the transmission path for the TSN stream includes resetting a transmission path for the TSN stream, and configuring a switching node on the transmission path, for example, configuring a scheduling and forwarding rule, for the TSN stream, of a switching node other than the second virtual switching node on the transmission path.

After reconfiguring the transmission path for the TSN stream, the CNC network element may send a notification response message to the SMF network element. The notification response message is used to indicate that the CNC network element has completed configuration update on the TSN stream, in other words, the configuration of the transmission path of the TSN stream has been completed. After switching of the anchor UPF network element in the 5G system is completed, the TSN stream may be transmitted through the second virtual switching node, and delay and bandwidth requirements of the TSN stream can be met. Correspondingly, the SMF network element receives the notification response message.

To configure the second virtual switching node, in step 601, the SMF network element may only determine that the anchor UPF network element of the PDU session needs to be switched from the first UPF network element to the second UPF network element, but is not switched yet. In other words, the SMF network element has not made a corresponding switching indication to enable the anchor UPF of the PDU session to be switched from the first UPF network element to the second UPF network element. After receiving the notification response message, the SMF network element may switch the anchor UPF of the PDU session from the first UPF network element to the second UPF network element.

For example, the SMF network element needs to establish a user plane connection between the RAN and the second UPF network element, and release a user plane connection between the RAN and the first UPF network element and a session connection between the SMF network element and the first UPF network element.

After the SMF network element determines that the anchor UPF of the PDU session is switched from the first UPF network element to the second UPF network element, the SMF network element completes internal switching of the virtual switching node, that is, switches from the first virtual switching node to the second virtual switching node, and may send a second notification message to the CNC network element, where the second notification message is used to notify the CNC network element that the virtual switching node of the TSN stream needs to change from the first virtual switching node to the second virtual switching node.

The following describes the method shown in FIG. 5 with reference to a specific application scenario.

In a specific application, based on a registration status of the UE, there may be two cases in which the UE is registered and the UE is unregistered. When the UE is registered with the 5G system and establishes the PDU session, and the established PDU session is not used to transmit the TSN stream, if the established PDU session subsequently needs to be used to carry the TSN stream, the established PDU session needs to be modified, to carry the TSN stream. In this case, the CNC network element needs to learn of the information about the virtual switching node (the 5G system functions as the virtual switching node), including the port information of the UE and the transmission delay between the UE and the UPF network element. For the port information of the UE, the SMF network element may send a port information obtaining request to the UE, to obtain the port information from the UE. For the transmission delay, the SMF network element may determine the transmission delay in the PDU session modification procedure. When the UE is unregistered with the 5G system, the UE may report the port information of the UE to the AMF network element during subsequent registration, so that the AMF network element can send the port information of the UE to the SMF network element when establishing the PDU session for the UE. Alternatively, the UE may directly report the port information of the UE to the SMF network element through the AMF network element when the session is established. For the transmission delay, the SMF network element determines the transmission delay in the PDU session establishment procedure. The following describes the two cases.

Case 1: the UE is registered.

Figure 7:
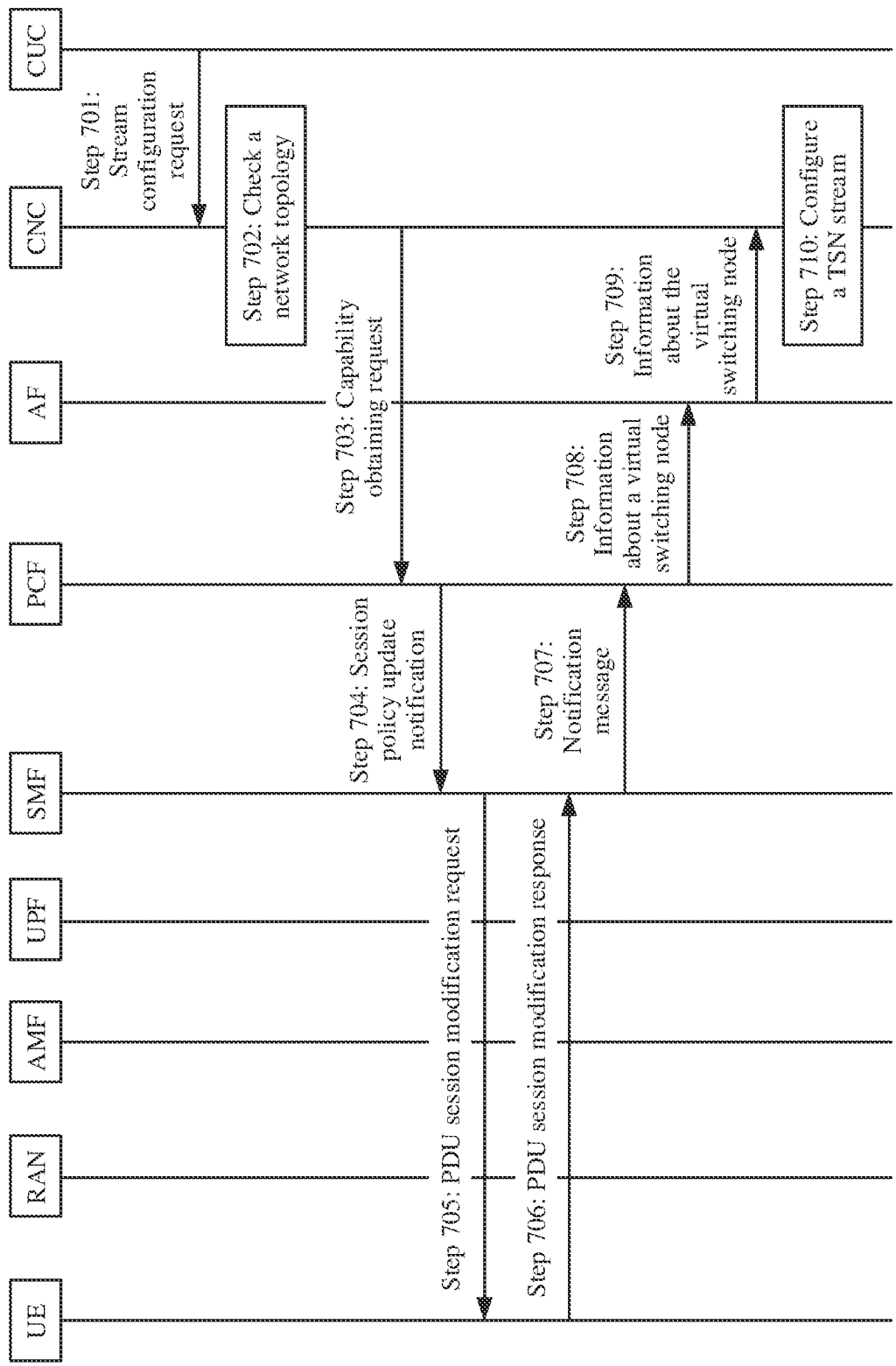

FIG. 7 shows a communication method according to an embodiment of this application. The method includes the following steps.

Step 701: A CUC network element sends a stream configuration request to the CNC network element, to request the CNC network element to configure a TSN stream for the CUC network element, where the stream configuration request includes information about the TSN stream.

The information about the TSN stream includes an identifier of the TSN stream, a source MAC address of the TSN stream, a destination MAC address of the TSN stream, and a transmission requirement for transmitting the TSN stream.

The identifier of the TSN stream is an identifier set to distinguish between different TSN streams. After learning of the identifier of the TSN stream, the CNC network element may establish a correspondence between the TSN stream and a transmit end, a correspondence between the TSN stream and a receive end, and a correspondence between the TSN stream and a transmission path of the TSN stream.

The source MAC address of the TSN stream and the destination MAC address of the TSN stream are a MAC address of the transmit end of data and a destination MAC address of the receive end of the data when the TSN stream is transmitted, and may provide a reference for subsequently configuring the TSN stream by the CNC network element, to determine a start end and a stop end of the transmission path of the TSN stream and determine the transmission path of the TSN stream.

The transmission requirement for transmitting the TSN stream includes a part or all of a maximum frame size (MaxFrameSize) of the TSN stream, a maximum interval between frames (MaxIntervalFrames), a frame priority parameter (PriorityAndRank), a maximum allowable delay of transmitting a single frame of the stream from the transmit end to the receive end, and the like.

The stream configuration request carries the transmission requirement for transmitting the TSN stream, and may provide a reference for configuring the TSN stream by the CNC network element subsequently, so that the transmission path of the TSN stream can meet the transmission requirement. The CNC network element may determine and calculate, based on the maximum frame size of the TSN stream and the maximum interval between frames, a bandwidth required for the TSN stream. The CNC network element configures the transmission path of the TSN stream based on the maximum allowable delay of transmitting the single frame of the stream from the transmit end to the receive end. The CNC network element may configure a scheduling policy of a switching node in TSN for the TSN stream based on the frame priority parameter.

Step 702: After receiving the stream configuration request, the CNC network element needs to configure the TSN stream. When configuring the transmission path for the TSN stream, the CNC network element first checks a TSN network element topology, and determines, based on the TSN network topology, whether there is a virtual switching node on the transmission path of the TSN stream.

An attribute of each switching node in the TSN network topology may be preconfigured in the CNC network element. For example, a specific switching node is a conventional switching node and a specific switching node is a virtual switching node. The preconfigured information may be used to determine that there is the virtual switching node on the transmission path of the TSN stream. The foregoing manner of determining that there is the virtual switching node on the transmission path of the TSN stream is merely an example. Another manner of determining that there is the virtual switching node in the network topology is not limited in this application, and any manner of determining that there is the virtual switching node in the network topology is applicable to this embodiment of this application.

The transmission path of the TSN stream is a path that is used to transmit the TSN stream and that includes switching nodes in the TSN network topology. To configure the transmission path, information about each switching node in the network topology needs to be obtained and maintained, for example, an identifier of a switching node and a topology relationship between the switching node and a neighbor node. For the conventional switching node, the conventional switching node has a capability of reporting information about the switching node. For the virtual switching node, the SMF network element in a 5G system needs to determine information about the virtual switching node, and the information about the virtual switching node needs to be reported to the CNC network element through an AF network element or the SMF network element.

Optionally, when reporting the information about the virtual switching node, the SMF network element or the AF network element indicates that a switching node is a virtual switching node.

Step 703: When determining that there is the virtual switching node in the TSN network topology, to obtain the information about the virtual switching node, the CNC network element may send a capability information obtaining request to a PCF network element in the 5G system through the AF network element, where the capability information obtaining request is used to request the information about the virtual switching node.

Optionally, the capability obtaining request includes the information about the TSN stream.

Step 704: After receiving the capability information obtaining request, the PCF network element determines that a PDU session needs to be modified, and sends a session policy update notification to the SMF network element.

Specifically, after receiving the capability information obtaining request from the CNC network element, the AF network element determines an identifier of corresponding UE based on a correspondence that is between the destination MAC address of the TSN stream and the identifier of the UE and that is included in the information about the TSN stream, and determines a DNN of TSN to which the CNC network element belongs.

The correspondence between the destination MAC address of the TSN stream and the identifier of the UE may be preconfigured, or may be obtained by the AF network element from another network element after receiving the capability information obtaining request from the CNC network element. The AF network element may determine, by using the destination MAC address of the TSN stream, specific UE that the TSN stream needs to pass through in a transmission process.

The AF network element sends all of the determined identifier of the UE, the DNN, and the capability information obtaining request to the PCF network element, and the PCF network element may determine, based on the identifier of the UE and the DNN, a specific PDU session, of the UE, that needs to be modified.

The PDU session determined by the PCF network element is a PDU session that needs to be modified. The PCF network element determines policy information based on the information that is about the TSN stream and that is carried in the capability information obtaining request. Because the PDU session has been currently established and the PDU session has corresponding policy information, that the PCF network element determines the policy information based on the TSN stream means that the policy information corresponding to the PDU session needs to be updated. For ease of description, the policy information determined by the PCF network element based on the TSN stream is referred to as updated policy information.

It should be noted that, because the information about the TSN stream carries the transmission requirement for transmitting the TSN stream, the PCF network element may determine, based on the information about the TSN stream, a requirement that a QoS flow needs to meet, that is, may determine the PCC rule.

The session policy update notification includes a part or all of a PDU session identifier, the identifier of the UE, and the updated policy information. For descriptions of the session policy update notification, refer to the embodiment shown in FIG. 5. Details are not described herein again.

After obtaining the updated policy information, the SMF network element may determine information such as a forwarding rule for data transmission based on the updated policy information, to perform related configuration on the UPF network element.

Step 705: After receiving the session policy update notification, the SMF network element needs to modify the established PDU session, and sends a PDU session modification request (PDU session modification command) to the UE.

The PDU session modification request may carry an indication message used to indicate the UE to determine port information of the UE. For example, an information element may be set to indicate the UE to determine the port information of the UE. Optionally, the PDU session modification request may be further used to indicate the UE to report the port information.

Step 706: After the UE receives the PDU session modification request, the UE determines, based on the PDU session identifier carried in the PDU session modification request, whether a DNN of the PDU session supports the TSN, and sends a PDU session modification response (PDU session modification command acknowledgement (ACK) to the SMF network element after determining that the DNN supports the TSN.

The PDU session modification response may carry the port information of the UE.

Specifically, the port information of the UE includes a port identifier (Port ID) of the UE and information about a transmission delay between a port of the UE and an external neighbor node. The port information of the UE further includes external topology information of the port of the UE.

Because the UE has a plurality of ports, and each port is connected to a different neighbor node, that is, each port has a corresponding neighbor node, the information about the transmission delay between the port of the UE and the external neighbor node includes a transmission delay between each port of the UE and the corresponding external neighbor node.

The SMF network element obtains the port information of the UE from the PDU session modification response.

Step 707: The SMF network element sends notification information to the PCF network element, where the notification information is used to notify the PCF network element that the modification of the PDU session is completed, the notification information may further include the information about the virtual switching node, and the information about the virtual switching node includes the port information of the UE.

Step 708: The PCF network element sends the information about the virtual switching node to the AF network element.

Optionally, the PCF may send the information about the virtual switching node to the AF network element through an NEF.

Step 709: After receiving the information about the virtual switching node, the AF network element forwards the information about the virtual switching node to the CNC network element.

Step 710: After receiving the information about the virtual switching node, the CNC network element may configure the TSN stream based on the information about the virtual switching node.

That the CNC network element configures the TSN stream includes configuring the transmission path of the TSN stream and each switching node on the transmission path. Configuring each switching node on the transmission path of the TSN stream specifically includes configuring scheduling and forwarding policies for an ingress port and an egress port of each switching node, so that the switching node performs queue management and forwarding on a data packet of the TSN stream according to the scheduling and forwarding policies, to meet delay and bandwidth requirements of the TSN stream.

It should be noted that alternatively, the SMF network element may directly interact with the AF network element. In steps 704 and 605, the AF network element may directly send the capability information obtaining request to the SMF network element. After receiving the capability information obtaining request, the SMF network element sends the information about the TSN stream to the PCF network element. After receiving the information about the TSN stream, the PCF network element sends the session policy update notification to the SMF network element, to modify the established PDU session.

In step 707, alternatively, the notification message may not carry the information about the virtual switching node, and the SMF network element may send the information about the virtual switching node to the PCF network element through separate signaling.

It should be noted that the information about the virtual switching node may further include an identifier of the virtual switching node. The identifier of the virtual switching node is an identifier set to distinguish between different switching nodes, and different virtual switching nodes correspond to different identifiers. There are many manners of setting the identifier of the virtual switching node. This is not limited in this embodiment of this application. The UPF network element in the virtual switching node changes, causing the virtual switching node to become another different virtual switching node. Therefore, an identifier of an anchor UPF network element in the virtual switching node may be used as the identifier of the virtual switching node, or the identifier of the virtual switching node may be set based on an identifier of the UPF network element in the virtual switching node.

In a possible implementation, an identifier may be preset for the UPF network element. For example, the preset identifier is delivered to the UPF network element through a 3rd generation partnership project (3GPP) network management system or the CNC network element, and different identifiers are preset for different UPF network elements. The UPF network element may report the preset identifier to the SMF network element, and use the preset identifier as the identifier of the virtual switching node to which the UPF network element belongs. An occasion for the UPF network element to report the identifier of the UPF and the preset identifier is not limited in this embodiment of this application. The UPF network element may report the identifier of the UPF and the preset identifier when being powered on or reporting port information of the UPF network element to the SMF network element. Any manner in which the SMF network element can obtain the identifier of the virtual switching node is applicable to this embodiment of this application.

When the identifier is preset for the UPF network element, to distinguish the conventional switching node in the TSN, the preset identifier may be specific to the virtual switching node. In other words, identifiers of the conventional switching node and the virtual switching node are different, and whether a switching node is a virtual switching node can be easily distinguished based on the identifiers. The CNC network element may store the TSN network topology and an identifier of each switching node in the network topology. When there is a need to determine whether there is the virtual switching node in the network topology, identification may be performed by using the identifier of each switching node.

Case 2: The UE is unregistered.

Figure 8B:
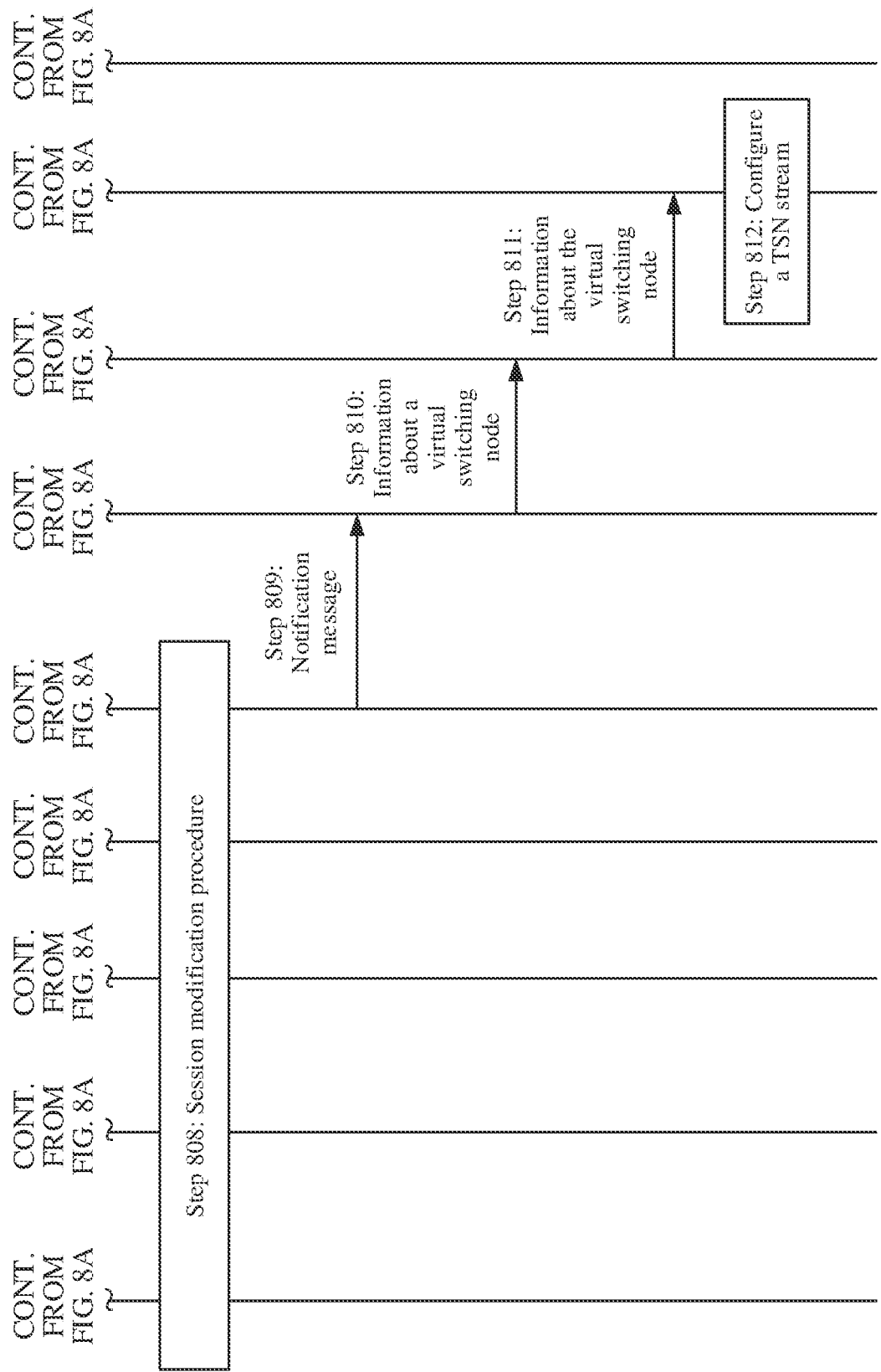

FIG. 8A and FIG. 8B show a communication method according to an embodiment of this application. The method includes the following steps.

Step 801: The UE initiates a registration procedure by sending a registration request to the AMF network element, and completes registration. In the registration process, the registration request may include port information of the UE. After receiving the registration request, the AMF network element stores the port information of the UE.

When the UE is unregistered, the UE first performs registration. If the UE is a device that can support a TSN service, the UE includes the port information of the UE in the registration request during registration.

Step 802: After the UE is registered, to perform data transmission, the UE needs to establish a PDU session, and the UE initiates a session establishment procedure by sending a PDU session establishment request.

In the session establishment process, the SMF network element may receive the port information of the UE in the following two manners.

Manner 1: After receiving the PDU session establishment request from the UE, the AMF network element sends, to the SMF network element, the port information of the UE that is stored during the registration of the UE. For example, the AMF network element may send a creation session management context request message including the port information to the SMF network element.

After receiving the PDU session establishment request of the UE, the AMF network element selects the SMF network element based on a DNN that is of the PDU session and that is carried in the PDU session establishment request, and a DNN set supporting the TSN service is preconfigured in the AMF network element. The AMF network element may determine, by using the DNN carried in the PDU session establishment request, whether the DNN supports the TSN service. After determining that the DNN supports the TSN service, the AMF network element needs to include the port information in the creation session management context request sent to the SMF. In this case, the preconfigured DNN set supporting the TSN is locally stored in the AMF network element, or may be stored in another device, and the AMF network element conveniently obtains the preconfigured DNN set supporting the TSN.

Manner 2: The PDU session establishment request of the UE carries the port information of the UE. After receiving the PDU session establishment request from the UE, the AMF network element sends a session management context creation request to the SMF network element, where the session management context creation request includes the PDU session establishment request, and the SMF network element obtains the port information of the UE from the session establishment request.

In other words, the UE may include the port information of the UE in the registration request, or may include the port information of the UE in the PDU session establishment request. The UE may include the port information of the UE in either of the registration request and the PDU session establishment request, or may include the port information of the UE in both the registration request and the PDU session establishment request, or may include the port information of the UE in another message. This is not limited in this embodiment of this application, and any manner in which the SMF network element can receive the port information of the UE is applicable to this embodiment of this application.

It should be noted that, if determining that the established PDU session needs to carry a TSN stream, for example, determining, based on a correspondence between an APP in the UE and a DNN, that the PDU session that needs to be established needs to carry the TSN stream, the UE may include the port information of the UE in the PDU session establishment request. If the established PDU session does not need to carry the TSN stream, the PDU session establishment request may not carry the port information of the UE.

Step 803: In the session establishment process, after obtaining the port information of the UE, the SMF network element may send the port information of the UE to the CNC network element.

The SMF network element may send the port information of the UE to the CNC network element through the AF network element.

Step 804: This step is the same as step 701. For details, refer to related descriptions of step 701. Details are not described herein again.

Step 805: This step is the same as step 702. For details, refer to related descriptions of step 702. Details are not described herein again.

Step 806: This step is the same as step 703. For details, refer to related descriptions of step 703. Details are not described herein again.

Step 807: This step is the same as step 704. For details, refer to related descriptions of step 704. Details are not described herein again.

Step 808: The SMF network element performs a session modification procedure. Different from the embodiment shown in FIG. 7, the SMF network element does not need to obtain the port information of the UE in the session modification procedure.

Step 809: After performing the session modification procedure, the SMF network element sends notification information to the PCF network element, where the notification information is used to notify the PCF network element that the SMF network element has completed a corresponding operation based on the updated policy information, and the notification information may further include information about the virtual switching node.

In this embodiment of this application, because the SMF network element sends the port information of the UE to the CNC network element in advance in step 803, the information about the virtual switching node in step 809 may not carry the port information of the virtual switching node. Optionally, alternatively, the SMF network element may not send the port information of the UE to the CNC network element in advance, that is, step 803 is not performed, but the information about the virtual switching node in step 810 carries the port information of the UE.

Step 810: This step is the same as step 708. For details, refer to related descriptions of step 708. Details are not described herein again.

Step 811: This step is the same as step 709. For details, refer to related descriptions of step 709. Details are not described herein again.

Step 812: This step is the same as step 710. For details, refer to related descriptions of step 710. Details are not described herein again.

It should be noted that alternatively, the SMF network element may directly interact with the AF network element. In steps 806 and 807, the AF network element may directly send the capability information obtaining request to the SMF network element. After receiving the capability information obtaining request, the SMF network element sends information about the TSN stream to the PCF network element. After receiving the information about the TSN stream, the PCF network element initiates a session management policy modification procedure.

In step 809, alternatively, the notification message may not carry the information about the virtual switching node, and the SMF network element may send the information about the virtual switching node to the PCF network element through separate signaling.

With reference to a specific application scenario, the following further describes the embodiment shown in FIG. 6 of this application by using an example in which a source anchor UPF network element is a first UPF network element and a target anchor UPF network element is the second UPF network element.

Figure 9A:
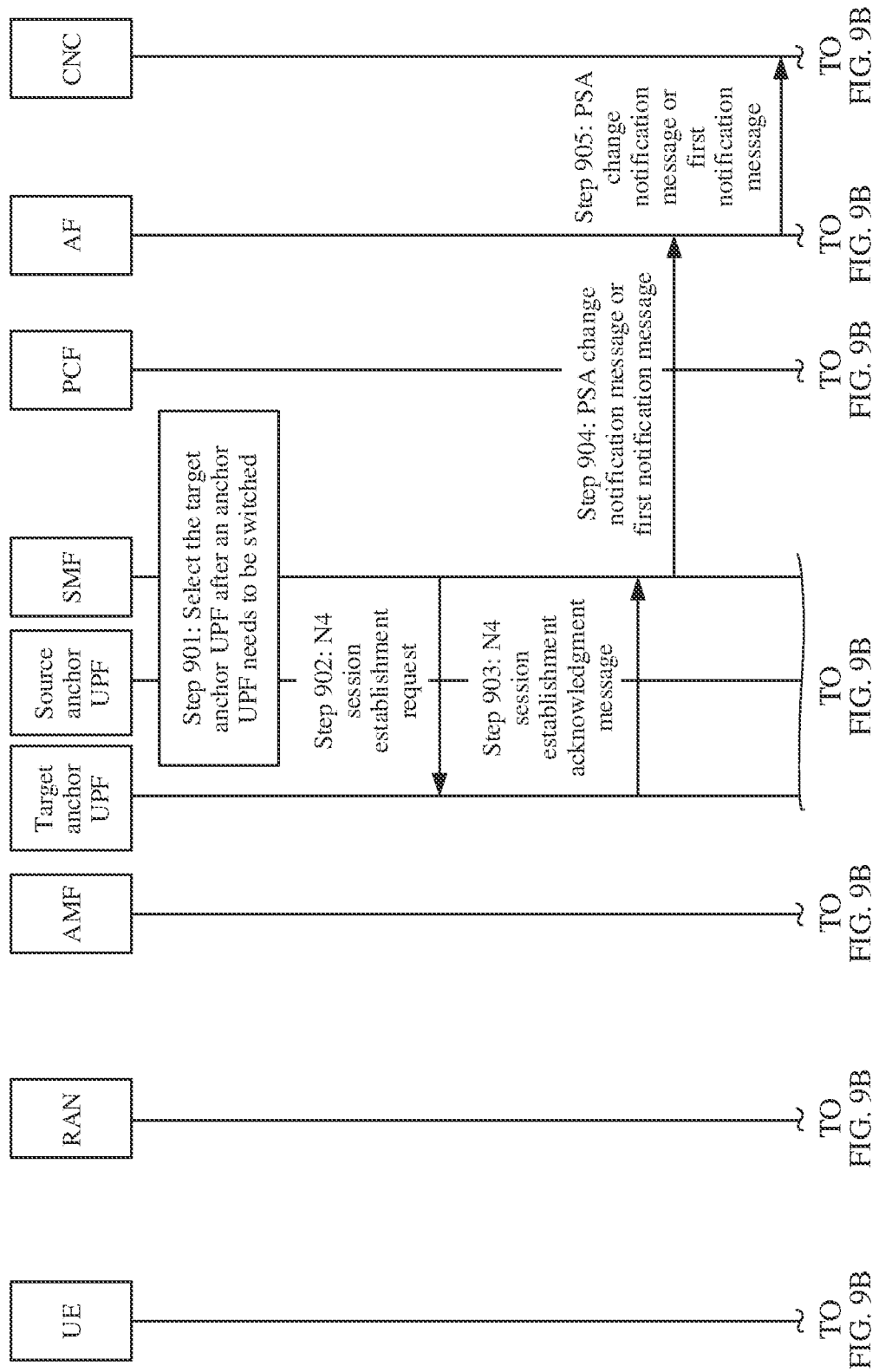
Figure 9B:
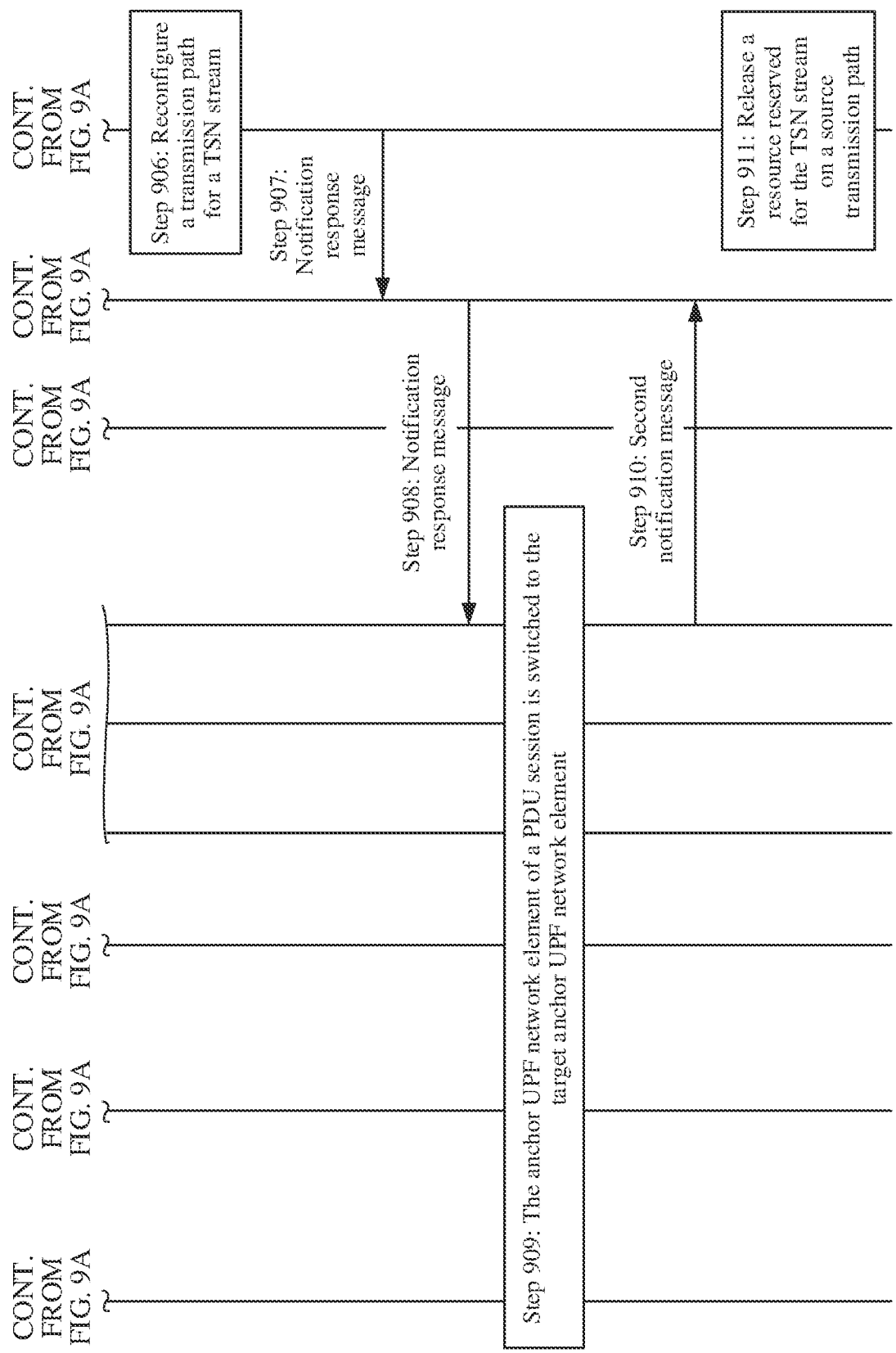

FIG. 9A and FIG. 9B show a communication method according to an embodiment of this application. The method includes the following steps.

Step 901: After determining that an anchor UPF network element needs to be switched, an SMF network element selects the target anchor UPF network element (corresponding to the second UPF network element in the embodiment shown in FIG. 6).

Step 902: The SMF network element sends an N4 session establishment request to the target anchor UPF network element, and may further indicate the target anchor UPF network element to report port information of the target anchor UPF network element.

Step 903: After receiving the N4 session establishment request, the target anchor UPF network element sends an N4 session establishment acknowledgment message to the SMF network element, where the N4 session establishment acknowledgment message may carry a part or all of an identifier of a virtual switching node and a port identifier of the UPF network element.

The identifier of the virtual switching node is an identifier of a virtual switching node corresponding to the target anchor UPF network element.

It should be noted that, in this embodiment of this application, when the anchor UPF network element changes, it indicates that the virtual switching node changes and becomes a new virtual switching node. Different virtual switching nodes may be distinguished between through the UPF network element in a 5G system. To be specific, identifiers may be configured for different UPF network elements, and an identifier of the UPF network element is used as the identifier of the virtual switching node. When the anchor UPF network element changes, an identifier of the target anchor UPF network element is used as an identifier of the new virtual switching node, and is notified to the SMF network element.

Step 904: The SMF network element sends a PDU session anchor (PSA) change notification message to an AF network element, where the PSA change notification message is used to notify that the anchor UPF network element changes, and the PSA change notification message includes an identifier of a TSN stream and information about the virtual switching node corresponding to the target anchor UPF network element. The identifier of the TSN stream is an identifier of a TSN stream affected by a change of the anchor UPF network element, that is, an identifier of a TSN stream whose transmission with the UE is switched from the source anchor UPF network element to the target anchor UPF network element. The information about the virtual switching node corresponding to the target anchor UPF network element includes a part or all of the identifier of the virtual switching node, port information of the virtual switching node, and delay information of the virtual switching node. For descriptions of the information about the virtual switching node, refer to related descriptions of the embodiment shown in FIG. 8A and FIG. 8B. Details are not described herein again.

The SMF network element may send the PSA change notification message to the AF network element through an NEF, or may send the change notification message to the AF network element through a PCF network element.

Optionally, the PSA change notification message may further include information about a virtual switching node corresponding to the source anchor UPF network element.

Step 905: After receiving the PSA change notification message, the AF network element may directly forward the change notification message, or may convert the PSA change notification message into a first notification message used to notify a CNC network element that the port information of the virtual switching node (the virtual switching node corresponding to the source anchor UPF network element and/or the virtual switching node corresponding to the target anchor UPF network element) is updated. The first notification message may include the identifier of the TSN stream affected by the switching of the anchor UPF network element and the information about the virtual switching node corresponding to the target anchor UPF network element. Optionally, the first notification message further includes the information about the virtual switching node corresponding to the source anchor UPF network element.

For steps 904 and 905, in another possible implementation, the SMF network element may not send the PSA change notification message to the AF network element, but send the first notification message to the AF network element. The first notification message is further used to notify that a virtual switching node of the TSN stream needs to change from the virtual switching node corresponding to the source anchor UPF network element to the virtual switching node corresponding to the target anchor UPF network element. Optionally, the first notification message further includes the information about the virtual switching node corresponding to the source anchor UPF network element.

The AF network element sends the first notification message to the CNC network element after receiving the first notification message.

Step 906: The CNC network element performs configuration update on the TSN stream based on the first notification message, that is, reconfigures a transmission path for the TSN stream.

Specifically, the CNC network element plans a new transmission path for the TSN stream, and configures a switching node (which is a switching node other than the virtual switching node corresponding to the target anchor UPF network element) on the transmission path of the TSN stream.

Step 907: After completing the configuration update on the TSN stream, the CNC network element sends a notification response message to the AF network element, where the notification response message is used to notify that the configuration update on the TSN stream is completed.

Step 908: The AF network element forwards the notification response message to the SMF network element.

Step 909: After receiving the notification response message, the SMF network element switches the anchor UPF network element of the PDU session to the target anchor UPF network element.

Specifically, the SMF network element sends a PDU session modification request to a RAN through an AMF network element, and updates N3 tunnel information of the target anchor UPF network element to the RAN. The RAN sends a PDU session modification response message to the SMF network element through the AMF network element, where the PDU session modification response message includes RAN tunnel information.

The N3 tunnel information of the target anchor UPF network element and access network node tunnel information are used to establish an N3 tunnel between the RAN and the target anchor UPF network element, and a session connection is established between the RAN and the target anchor UPF network element to perform data transmission.

After establishing the session connection between the RAN and the target anchor UPF network element, the SMF network element may further release a session connection between the source anchor UPF network element and the SMF.

Step 910: After switching the anchor UPF network element of the PDU session to the target anchor UPF network element, the SMF network element sends a second notification message to the CNC network element, where the second notification message is used to notify that the switching has been performed from the virtual switching node corresponding to the source anchor UPF network element to the virtual switching node corresponding to the target anchor UPF network element.

Step 911: After receiving the second notification message, the CNC network element reconfigures a switching node on a source transmission path for the TSN stream, for example, indicates the switching node on the source transmission path to release a resource reserved for the TSN stream, where the source transmission path is a transmission path of the TSN stream before the anchor UPF network element is switched.

In the embodiments shown in FIG. 5 and FIG. 6, the transmission delay is determined by the SMF in the procedure of establishing the QoS flow of the UE, for example, in a process of establishing the QoS flow during PDU session establishment or in a process of establishing the QoS flow during PDU session modification. Actually, alternatively, the transmission delay may not be determined in the procedure of establishing the QoS flow, and may be determined by the SMF network element and notified to the CNC network element before the QoS flow is established. The following describes this manner.

Figure 10:
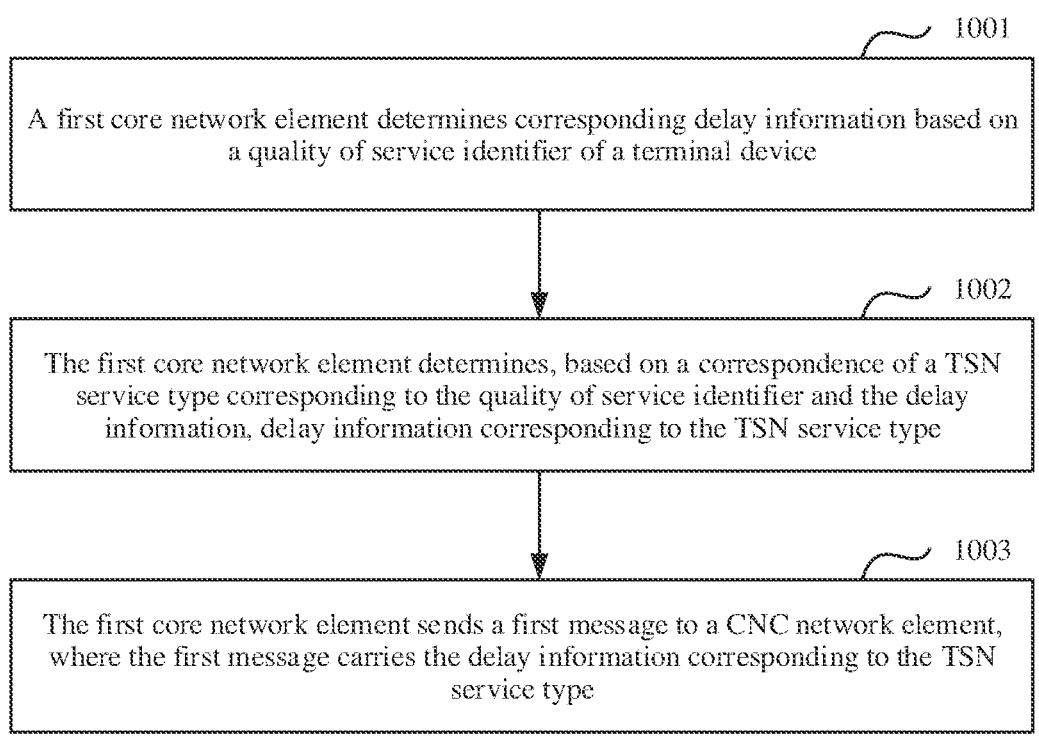

FIG. 10 shows a communication method according to an embodiment of this application. The method includes the following steps.

Step 1001: A first core network element determines corresponding delay information based on a quality of service identifier of UE, where the delay information is used to indicate a transmission delay between the UE and a UPF network element.

A type of the first core network element is not limited in this embodiment of this application. For example, the first core network element may be an SMF network element, or may be a PCF network element, or may be another core network element. Any method in which steps performed by the first core network element in this embodiment of this application can be implemented is applicable to this embodiment of this application.

During subscription, the UE has different quality of service requirements for subscribed services. To distinguish between the different quality of service requirements, a quality of service identifier may be set, and a quality of service requirement corresponding to the subscribed service may be determined by using the quality of service identifier. When a 5G system or another communications system needs to provide a service for the UE, corresponding setting may be performed based on the quality of service identifier, to ensure that the provided service meets the quality of service requirement.

The quality of service requirement includes an information transmission delay, bandwidth guarantee, and the like. Therefore, the quality of service identifier may be used to indicate a requirement of the UE for a transmission delay of the subscribed service.

A specific form of the quality of service identifier is not limited in this embodiment of this application. In the 5G system, the quality of service identifier may be a 5QI in a Qos parameter, and any parameter that can reflect the requirement of the UE for the transmission delay is applicable to this embodiment of this application. In this embodiment of this application, a quantity of quality of service identifiers is not limited. The UE may subscribe to a plurality of services, and each service may correspond to one quality of service identifier.

Before determining the corresponding delay information based on the quality of service identifier, the first core network element needs to first obtain the quality of service identifier. The first core network element may locally store the quality of service identifier of the UE, where the quality of service identifier of the UE is a subscribed quality of service identifier of the UE, or may obtain a subscribed quality of service identifier of the UE from another network element.

If the first core network element is the PCF network element, the PCF network element may obtain a subscribed QoS parameter of the UE from a unified data repository (UDR) network element or a UDM network element, and obtain the quality of service identifier of the UE from the subscribed QoS parameter of the UE.

If the first core network element is the SMF network element, the SMF network element may obtain the quality of service identifier of the UE from the PCF network element. Alternatively, the SMF network element may obtain a subscribed quality of service identifier of the UE from session subscription information of the UE. To be specific, the SMF network element may obtain, from a UDR network element or a UDM network element, a subscribed quality of service identifier corresponding to a session of the UE. For a PDU session of a specific type, the UE may have a specific subscribed quality of service identifier.

Because the quality of service identifier may be used to indicate the requirement of the UE for the transmission delay of the subscribed service, after obtaining the quality of service identifier, the first core network element may determine the corresponding delay information based on the quality of service identifier. The delay information is a transmission delay of a corresponding subscribed service.

Step 1002: The first core network element determines, based on a correspondence of a TSN service type corresponding to the quality of service identifier and the delay information, delay information corresponding to the TSN service type.

A switching node in TSN schedules and forwards data packets of different TSN streams by using the TSN service type (traffic class). A value of the TSN service type ranges from 0 to 7. A smaller value of a TSN service type corresponding to a TSN stream indicates a higher priority of scheduling and forwarding the TSN stream by the switching node.

A 3GPP system may determine, based on requirements such as a bandwidth and a delay of the TSN stream, a 5QI corresponding to the TSN stream, and determine a transmission delay of the TSN stream between the UE and the UPF network element in the 3GPP system based on the 5QI. The TSN also determines the TSN service type corresponding to the TSN stream based on the requirements such as the bandwidth and the delay of the TSN stream. The switching node in the TSN processes a data packet of the TSN stream based on the TSN service type, so that the data packet of the TSN stream undergoes different transmission delays inside the switching node and between switching nodes. Therefore, a correspondence between the 5QI and the TSN service type may be preconfigured, to ensure QoS of the TSN stream transmitted when the TSN communicates with the 3GPP system. As shown in Table 2, there may be a one-to-one relationship between the 5QI and the TSN service type, or one 5QI may be mapped to a plurality of TSN service types, or a plurality of 5QIs may be mapped to one TSN service type.

TABLE 2

| Quality of service (QOS) identifier subscribed to by UE | TSN service type |
|---|---|
| 5QI-1 | TSN traffic class 0 |
| 5QI-2 and 5QI-3 | TSN traffic class 1 |
| 5QI-6 | TSN traffic class 2 and TSN traffic class 3 |

Before the first core network element performs step 1002, the first core network element may first determine the TSN service type corresponding to the quality of service identifier, and the first core network element may determine, based on the preconfigured correspondence between the quality of service identifier and the TSN service type, the TSN service type corresponding to the quality of service identifier. The preconfigured correspondence between the quality of service identifier and the TSN service type may be locally stored, or may be stored in another network element. The first core network element may alternatively obtain the preconfigured correspondence between the quality of service identifier and the TSN service type from the another network element, and then determine the TSN service type corresponding to the quality of service identifier based on the preconfigured correspondence between the quality of service identifier and the TSN service type.

The first core network element may alternatively obtain the TSN service type corresponding to the quality of service identifier from the another network element. For example, the preconfigured correspondence between the quality of service identifier and the TSN service type is stored in a second core network element, and the second core network element may determine the quality of service identifier of the UE, and then determine the TSN service type corresponding to the quality of service identifier based on the preconfigured correspondence between the quality of service identifier and the TSN service type. Then, the second core network element may send, to the first core network element, information carrying the TSN service type corresponding to the quality of service identifier. After receiving the information carrying the TSN service type corresponding to the quality of service identifier, the first core network element determines the TSN service type corresponding to the quality of service identifier.

If the first core network element is the PCF network element, the correspondence between the quality of service identifier and the TSN service type may be preconfigured in the PCF network element. After obtaining the quality of service identifier of the UE from the UDR network element or the UDM network element, the PCF may determine the TSN service type corresponding to the quality of service identifier of the UE based on the preconfigured correspondence between the quality of service identifier and the TSN service type.

If the first core network element is the SMF network element, the SMF network element may obtain, from the PCF network element, the TSN service type corresponding to the quality of service identifier.

After determining the delay information corresponding to the quality of service identifier of the terminal device and the TSN service type corresponding to the quality of service identifier, the first core network element may determine, based on the TSN service type corresponding to the quality of service identifier and the delay information, the delay information corresponding to the TSN service type.

The first core network element may use the delay information corresponding to the quality of service identifier as the delay information corresponding to the TSN service type, or may adjust the delay information corresponding to the quality of service identifier and use adjusted delay information corresponding to the quality of service identifier as the delay information corresponding to the TSN service type.

Step 1003: The first core network element sends a first message to a CNC network element, where the first message carries the delay information corresponding to the TSN service type.

The first core network element may directly send the first message to the CNC network element, or may send the first message to the CNC network element through another network element. A manner in which the first core network element sends the first message is not limited in this embodiment of this application, and any manner in which the CNC network element can obtain the delay information corresponding to the TSN service type is applicable to this embodiment of this application.

Figure 11:
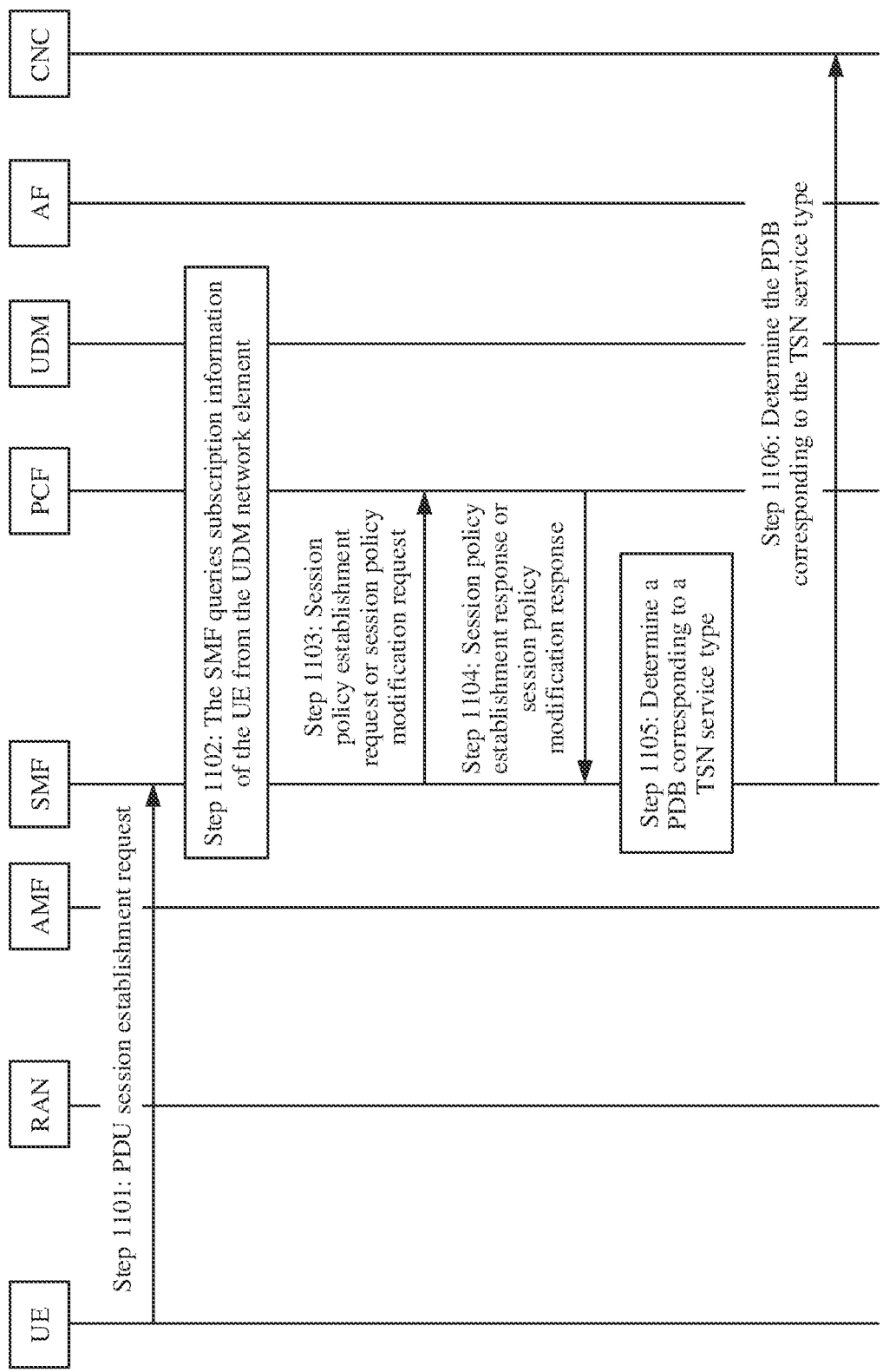

The following applies the embodiment shown in FIG. 10 to a specific scenario. The embodiment shown in FIG. 10 is described by using an example in which the first core network element is the SMF network element and the SMF network element initiates a session policy establishment procedure. FIG. 11 shows a communication method according to an embodiment of this application. The method includes the following steps.

Step 1101: UE sends a PDU session establishment request to the SMF network element, where the PDU session establishment request carries an identifier of the UE and a PDU session identifier.

Step 1102: After receiving the PDU session establishment request, the SMF network element queries subscription information that is related to a PDU session and that is of the UE from a UDM network element based on the identifier of the UE, where the subscription information includes one or more 5QIs of the UE.

The 5QI is a QoS parameter of the PDU session.

Step 1103: The SMF network element initiates a session policy establishment request or a session policy modification request to a PCF network element, where the session policy establishment request is used to request the PCF network element to set policy information for the PDU session, the session policy modification request is used to request the PCF network element to modify the policy information for the PDU session, and the session policy establishment request or the session policy modification request may include the identifier of the UE and the PDU session identifier.

Step 1104: After receiving the session policy establishment or modification request, the PCF network element sends a session policy establishment response or a session policy modification response to the SMF network element, and sends the session policy establishment response to the SMF network element if receiving the session policy establishment request, or sends the session policy modification response to the SMF network element if receiving the session policy modification request.

The session policy establishment or modification response carries a correspondence between a 5QI and a TSN service type. The correspondence between the 5QI and the TSN service type may be preconfigured in the PCF network element.

Step 1105: The SMF network element determines, based on the 5QI and the correspondence between the 5QI and the TSN service type, a TSN service type supported by the PDU session and a corresponding PDB.

Specifically, the SMF network element determines the PDB based on the 5QI. For a specific determining manner, refer to the embodiment shown in FIG. 5 in this application. Details are not described herein again.

The SMF network element determines, based on the correspondence between the 5QI and the TSN service type, the TSN service type supported by the PDU session.

The SMF network element uses the determined PDB as a PDB corresponding to the TSN service type.

Step 1106: The SMF network element sends the PDB corresponding to the TSN service type to a CNC network element.

When configuring a TSN stream, the CNC may determine delay information of a virtual switching node based on the TSN service type of the TSN stream and the PDB corresponding to the TSN service type.

In another implementation, the correspondence between the 5QI and the TSN service type may be preconfigured in the SMF network element, and steps 1103 and 1104 may be omitted.

It should be noted that the embodiments provided in this application may be independently performed, or may be performed in a combination manner. For example, the embodiment shown in FIG. 5 may be combined with the embodiment shown in FIG. 6. To be specific, the SMF network element first reports the port information of the UE, and then if the PDU session needs to be modified, the SMF network element notifies the CNC network element that the port information of the virtual switching node is updated. For another example, the embodiment shown in FIG. 5 may be combined with the embodiment shown in FIG. 10. To be specific, the SMF network element first reports the delay information before reporting the port information of the UE. A combination manner is not limited in the embodiments of this application.

Figure 12:
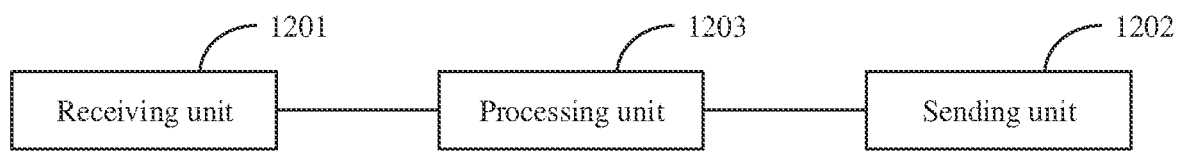
FIG. 12 to FIG. 18 each are a schematic structural diagram of a communications apparatus according to an embodiment of this application.

Based on a same inventive concept as that of the method embodiments, an embodiment of this application further provides a communications apparatus, configured to perform the method performed by the SMF network element in the method embodiments shown in FIG. 5, FIG. 7, and FIG. 8A and FIG. 8B. For related features, refer to the foregoing method embodiments. Details are not described herein again. As shown in FIG. 12, the apparatus includes a receiving unit 1201 and a sending unit 1202.

The receiving unit 1201 is configured to obtain port information of a terminal device, where the port information of the terminal device includes a port identifier of the terminal device and information about a transmission delay between a port of the terminal device and an external neighbor node.

The sending unit 1202 is configured to send the port information of the terminal device to a centralized network configuration network element.

The receiving unit 1201 may obtain the port information of the terminal device by using the following two methods.

In a first method, the receiving unit 1201 receives a PDU session establishment request from the terminal device, where the PDU session establishment request includes the port information of the terminal device.

In a second method, the receiving unit 1201 receives a PDU session modification response from the terminal device, where the PDU session modification response includes the port information of the terminal device.

In a possible implementation, the communications apparatus may further report a transmission delay. Specifically, the communications apparatus further includes a processing unit 1203. The processing unit 1203 may determine, in a procedure of establishing a QoS flow of the terminal device, a transmission delay between a user plane corresponding to the QoS flow and the terminal device. Then, the sending unit 1202 sends the transmission delay to the centralized network configuration network element.

When the processing unit 1203 determines the transmission delay between the user plane corresponding to the QoS flow and the terminal device, the receiving unit 1201 may first obtain a PCC rule of the QoS flow from a policy control network element. Then, the processing unit 1203 determines the transmission delay according to the PCC rule of the QoS flow.

For example, when the processing unit 1203 determines the transmission delay according to the PCC rule of the QoS flow, the processing unit 1203 first determines a PDB of the QoS flow based on a 5QI included in the PCC rule, and then determines the transmission delay based on the PDB.

Optionally, before the receiving unit 1201 obtains the port information of the terminal device, the sending unit 1202 may further send a first indication message to the terminal device, where the first indication message is used to indicate the terminal device to determine the port information of the terminal device.

In a possible implementation, the port information of the terminal device may further include external topology information of the port of the terminal device.

Figure 13:
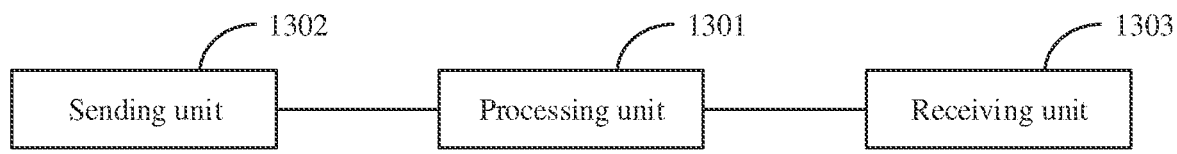

Based on a same inventive concept as that of the method embodiments, an embodiment of this application further provides a communications apparatus, configured to perform the method performed by the terminal device in the method embodiments shown in FIG. 5, FIG. 7, and FIG. 8A and FIG. 8B. For related features, refer to the foregoing method embodiments. Details are not described herein again. As shown in FIG. 13, the apparatus includes a processing unit 1301 and a sending unit 1302.

The processing unit 1301 is configured to determine that the communications apparatus supports a TSN service, a packet data unit PDU session corresponding to a TSN service needs to be established, a currently established PDU session needs to carry a TSN stream, or an established PDU session needs to carry a TSN stream.

The sending unit 1302 is configured to send port information of the terminal device to a session management network element, where the port information of the terminal device includes a port identifier of the terminal device and information about a transmission delay between a port of the terminal device and an external neighbor node.

The sending unit 1302 sends the port information of the terminal device to the session management network element in many manners. The following lists three of the manners.

Manner 1: The sending unit 1302 sends a PDU session establishment request to the session management network element through an access and mobility management network element, where the PDU session establishment request includes the port information of the terminal device.

Manner 2: The sending unit 1302 sends, to an access and mobility management network element, a registration request that carries the port information of the terminal device, so that subsequently, the access and mobility management network element sends the port information of the terminal device to the session management network element when receiving a PDU session establishment request sent by the terminal device.

Manner 3: The processing unit 1301 determines, based on indication information in a PDU session modification request received from the session management network element, that the established PDU session needs to carry the TSN stream. In this case, the sending unit 1302 may send a PDU session modification response to the session management, where the PDU session modification response includes the port information of the terminal device.

The processing unit 1301 determines the PDU session corresponding to the currently established TSN service in many manners. The following lists two of the manners.

Manner 1: The processing unit 1301 may determine, based on indication information in a PDU session establishment acknowledgment message received from the session management network element, that the established PDU session needs to carry the TSN stream.

Manner 2: The processing unit 1301 determines, based on a DNN corresponding to the PDU session that needs to be established, that the PDU session needs to carry the TSN stream.

Optionally, the communications apparatus further includes a receiving unit 1303. The receiving unit 1303 may receive a first indication message from the session management network element, where the first indication message is used to indicate the terminal device to determine the port information of the terminal device. Then, the processing unit 1301 may determine the port information of the terminal device.

In a possible implementation, the port information of the terminal device further includes external topology information of the port of the terminal device.

Figure 14:
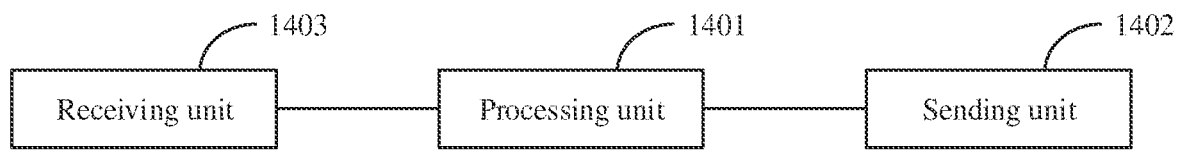

Based on a same inventive concept as that of the method embodiments, an embodiment of this application further provides a communications apparatus, configured to perform the method performed by the SMF network element in the method embodiments shown in FIG. 6 and FIG. 9A and FIG. 9B. For related features, refer to the foregoing method embodiments. Details are not described herein again. As shown in FIG. 14, the apparatus includes a processing unit 1401 and a sending unit 1402.

The processing unit 1401 is configured to determine that an anchor user plane network element of a PDU session of a terminal device needs to be switched from a first user plane network element to a second user plane network element, and determine that the PDU session is a session that communicates with TSN.

The sending unit 1402 is further configured to, when the processing unit 1401 determines that the PDU session is the session that communicates with the TSN, send a first notification message to a centralized network configuration network element, where the first notification message is used to notify the centralized network configuration network element that port information of a first virtual switching node and/or port information of a second virtual switching node are/is updated, the first virtual switching node is a virtual switching node corresponding to the first user plane network element, and the second virtual switching node is a virtual switching node corresponding to the second user plane network element.

In a possible implementation, the processing unit 1401 may further determine that the PDU session carries a TSN stream. When the processing unit 1401 determines that the PDU session carries the TSN stream, the first notification message is further used to notify that a virtual switching node of the TSN stream needs to change from the first virtual switching node to the second virtual switching node.

Optionally, the processing unit 1401 may further update the port information of the first virtual switching node and the port information of the second virtual switching node based on port information of the terminal device.

In addition to having an indication function, the first notification message may further carry some port information, and may carry a part or all of the following messages:

Message 1: an identifier of the second virtual switching node and updated port information of the second virtual switching node.

Message 2: an identifier of the second virtual switching node and port information used by the second virtual switching node to transmit the TSN stream.

Message 3: identification information of the first virtual switching node and updated port information of the first virtual switching node by the session management.

Optionally, the first notification message may further include an identifier of the TSN stream.

In a possible implementation, the communications apparatus further includes a receiving unit 1403. The receiving unit 1403 may receive a notification response message from the centralized network configuration network element, where the notification response message is used to indicate that the centralized network configuration network element has completed configuration update on the TSN stream.

After the receiving unit 1403 receives the notification response message from the centralized network configuration network element, the processing unit 1401 may switch the anchor user plane network element of the PDU session from the first user plane network element to the second user plane network element.

In a possible implementation, after the receiving unit 1403 receives the notification response message from the centralized network configuration network element, the sending unit 1402 may further send a second notification message to the centralized network configuration network element, where the second notification message is used to notify the centralized network configuration that the virtual switching node of the TSN stream changes from the first virtual switching node to the second virtual switching node.

Figure 15:
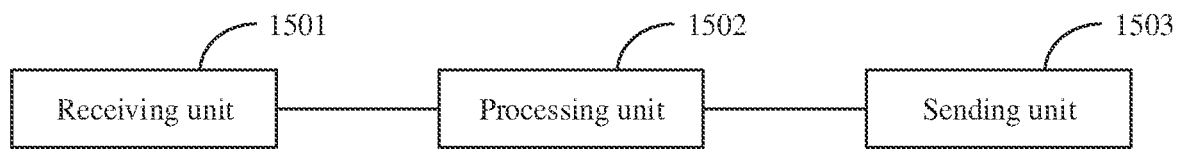

Based on a same inventive concept as that of the method embodiments, an embodiment of this application further provides a communications apparatus, configured to perform the method performed by the CNC network element in the method embodiments shown in FIG. 6 and FIG. 9A and FIG. 9B. For related features, refer to the foregoing method embodiments. Details are not described herein again. As shown in FIG. 15, the apparatus includes a receiving unit 1501.

The receiving unit 1501 is configured to receive a first notification message from a session management network element, where the first notification message is used to notify that port information of a first virtual switching node and/or port information of a second virtual switching node are/is updated.

Optionally, the communications apparatus further includes a processing unit 1502. If the first notification message is further used to notify that a virtual switching node of a TSN stream needs to change from the first virtual switching node to the second virtual switching node, the processing unit 1502 may reconfigure a transmission path for the TSN stream based on the first notification message.

In addition to having an indication function, the first notification message may further carry some port information, and may carry a part or all of the following messages.

Message 1: an identifier of the second virtual switching node and updated port information of the second virtual switching node by the session management.

Message 2: an identifier of the second virtual switching node and port information used by the second virtual switching node to transmit the TSN stream.

Message 3: identification information of the first virtual switching node and updated port information of the first virtual switching node by the session management.

Optionally, the first notification message may further include an identifier of the TSN stream.

In a possible implementation, the communications apparatus further includes a sending unit 1503. After the processing unit 1502 reconfigures the transmission path for the TSN stream, the sending unit 1503 may further send a notification response message to the session management network element, where the notification response message is used to indicate that the centralized network configuration network element has completed configuration update on the TSN stream.

In a possible implementation, the receiving unit 1501 may receive a second notification message sent by the session management network element, where the second notification message is used to notify that the virtual switching node of the TSN stream changes from the first virtual switching node to the second virtual switching node. Then, the processing unit 1502 releases a resource on a source transmission path of the TSN stream.

Figure 16:
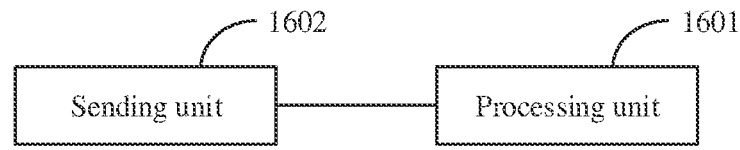

Based on a same inventive concept as that of the method embodiments, an embodiment of this application further provides a communications apparatus, configured to perform the method performed by the SMF network element or the first core network element in the method embodiments shown in FIG. 10 and FIG. 11. For related features, refer to the foregoing method embodiments. Details are not described herein again. As shown in FIG. 16, the apparatus includes a processing unit 1601 and a sending unit 1602.

The processing unit 1601 is configured to determine corresponding delay information based on a quality of service identifier of a terminal device, where the delay information is used to indicate a transmission delay between the terminal device and a user plane network element, and determine, based on a TSN service type corresponding to the quality of service identifier and the delay information, delay information corresponding to the TSN service type.

The sending unit 1602 is configured to send a first message to a centralized network configuration network element, where the first message carries the delay information corresponding to the TSN service type.

In a possible implementation, before determining the corresponding delay information based on the quality of service identifier of the terminal device, the processing unit 1601 may further determine the quality of service identifier based on subscription information of the UE.

Division into units in the embodiments of this application is an example, is merely logical function division, and may be other division in actual implementation. In addition, functional units in the embodiments of this application may be integrated into one processor, or may exist alone physically, or two or more units are integrated into one module. The foregoing integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a terminal device (which may be a personal computer, a mobile phone, or a network device, or the like) or a processor to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

In the embodiments of this application, both the base station and the terminal device may be presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions.

Figure 17:
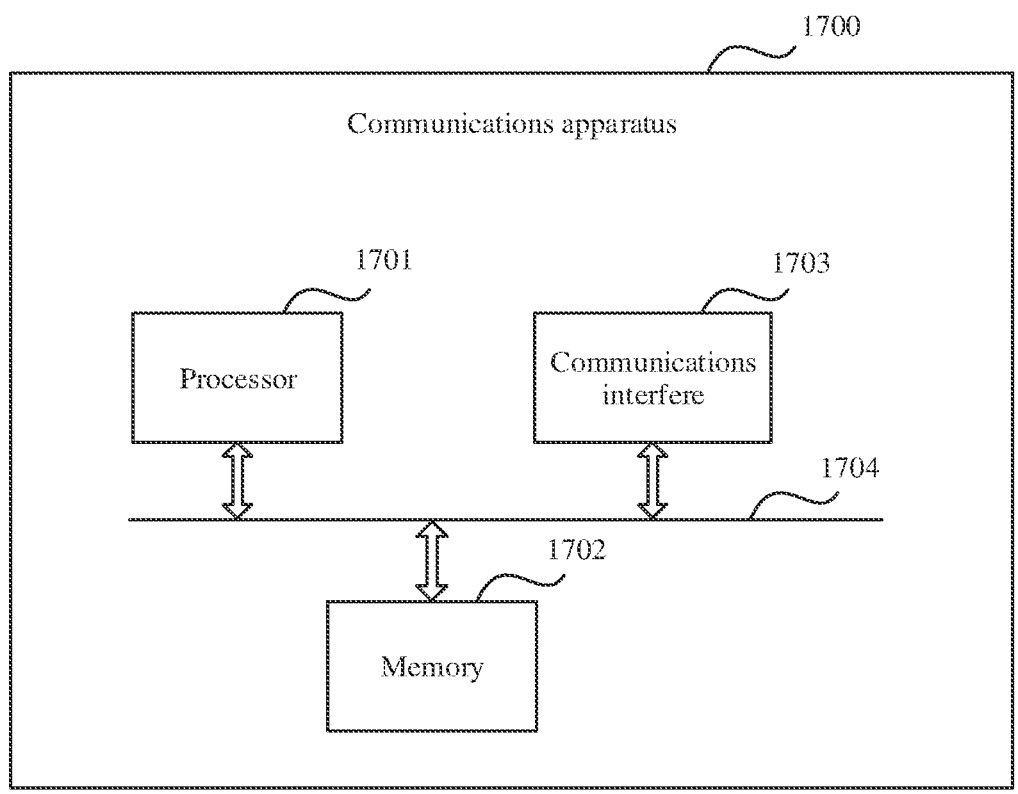

In a simple embodiment, a person skilled in the art may figure out that the session management network element and the centralized network configuration network element may be in the form shown in FIG. 17.

A communications apparatus 1700 shown in FIG. 17 includes at least one processor 1701 and a memory 1702, and optionally, may further include a communications interface 1703.

The memory 1702 may be a volatile memory such as a random access memory. Alternatively, the memory may be a nonvolatile memory such as a read-only memory, a flash memory, a hard disk drive (HDD), or a solid-state drive (SSD). Alternatively, the memory 1702 is any other medium that can be used to carry or store expected program code in a command or data structure form and that can be accessed by a computer. However, this is not limited thereto. The memory 1702 may be a combination of the foregoing memories.

A specific connection medium between the processor 1701 and the memory 1702 is not limited in this embodiment of this application. In this embodiment of this application, the memory 1702 is connected to the processor 1701 through a bus 1704 in the figure. The bus 1704 is represented by one thick line in the figure. A connection manner between other components is schematically described, and is not limited thereto. The bus 1704 may be classified into an address bus, a data bus, a control bus, and the like. For ease of representation, only one thick line is used to represent the bus in FIG. 17, but this does not mean that there is only one bus or only one type of bus.

The processor 1701 may have a data receiving and sending function, and can communicate with another device. In the apparatus shown in FIG. 17, an independent data receiving and sending module, for example, the communications interface 1703, may also be disposed and is configured to receive and send data. When communicating with the another device, the processor 1701 may transmit data through the communications interface 1703.

When the session management network element is in the form shown in FIG. 17, the processor 1701 in FIG. 17 may invoke computer-executable instructions stored in the memory 1702, to enable the base station to perform the method performed by the base station in any one of the foregoing method embodiments.

Specifically, functions/implementation processes of the sending unit, the receiving unit, and the processing unit in FIG. 12 and FIG. 14 may be implemented by the processor 1701 in FIG. 17 by invoking the computer-executable instructions stored in the memory 1702. Alternatively, functions/implementation processes of the processing unit in FIG. 12 and FIG. 14 may be implemented by the processor 1701 in FIG. 17 by invoking the computer-executable instructions stored in the memory 1702, and functions/implementation processes of the sending unit and the receiving unit in FIG. 12 and FIG. 14 may be implemented through the communications interface 1703 in FIG. 17.

When the centralized network configuration network element is in the form shown in FIG. 17, the processor 1701 in FIG. 17 may invoke computer-executable instructions stored in the memory 1702, to enable the base station to perform the method performed by the base station in any one of the foregoing method embodiments.

Specifically, functions/implementation processes of the sending unit, the receiving unit, and the processing unit in FIG. 15 may be implemented by the processor 1701 in FIG. 17 by invoking the computer-executable instructions stored in the memory 1702. Alternatively, functions/implementation processes of the processing unit in FIG. 15 may be implemented by the processor 1701 in FIG. 17 by invoking the computer-executable instructions stored in the memory 1702, and functions/implementation processes of the sending unit and the receiving unit in FIG. 15 may be implemented through the communications interface 1703 in FIG. 17.

When the first core network element is in the form shown in FIG. 17, the processor 1701 in FIG. 17 may invoke computer-executable instructions stored in the memory 1702, to enable the base station to perform the method performed by the base station in any one of the foregoing method embodiments.

Specifically, functions/implementation processes of the sending unit and the processing unit in FIG. 16 may be implemented by the processor 1701 in FIG. 17 by invoking the computer-executable instructions stored in the memory 1702. Alternatively, functions/implementation processes of the processing unit in FIG. 16 may be implemented by the processor 1701 in FIG. 17 by invoking the computer-executable instructions stored in the memory 1702, and functions/implementation processes of the sending unit in FIG. 16 may be implemented through the communications interface 1703 in FIG. 17.

Figure 18:
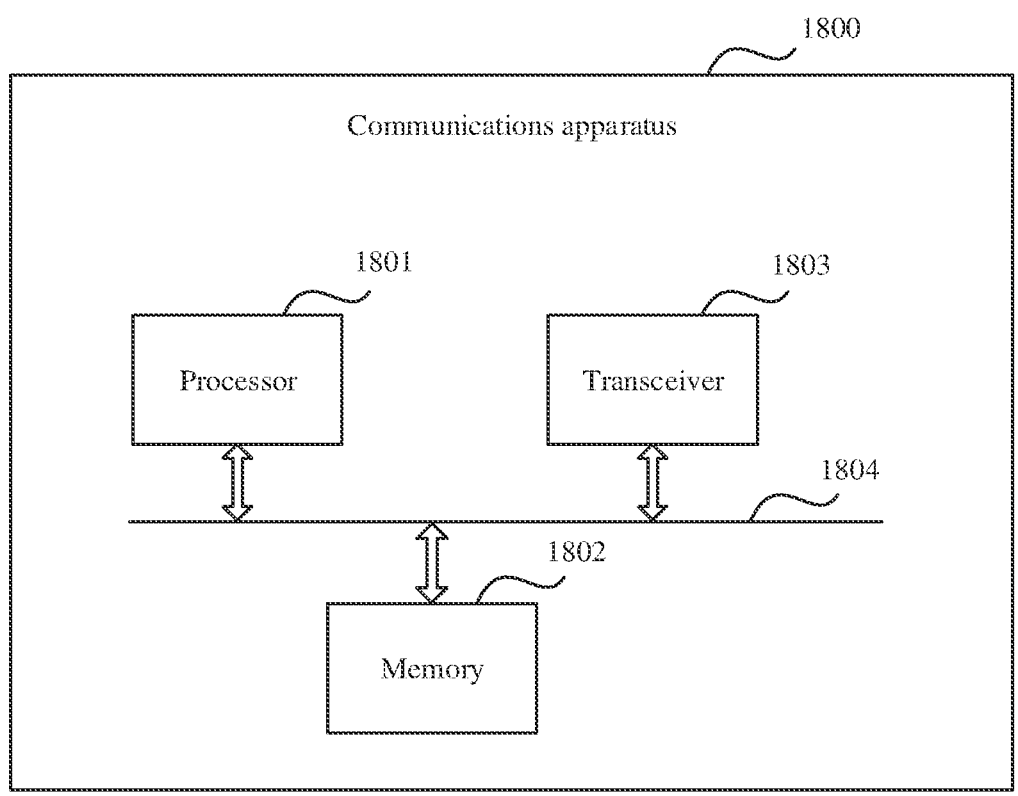

In a simple embodiment, a person skilled in the art may figure out that the terminal device may be in the form shown in FIG. 18.

A communications apparatus 1800 shown in FIG. 18 includes at least one processor 1801 and a memory 1802, and optionally, may further include a transceiver 1803.

The memory 1802 may be a volatile memory such as a random access memory. Alternatively, the memory may be a nonvolatile memory such as a read-only memory, a flash memory, a hard disk drive (HDD), or a solid-state drive (SSD). Alternatively, the memory 1802 is any other medium that can be used to carry or store expected program code in a command or data structure form and that can be accessed by a computer. However, this is not limited thereto. The memory 1802 may be a combination of the foregoing memories.

A specific connection medium between the processor 1801 and the memory 1802 is not limited in this embodiment of this application. In this embodiment of this application, the memory 1802 is connected to the processor 1801 through a bus 1804 in the figure. The bus 1804 is represented by one thick line in the figure. A connection manner between other components is schematically described, and is not limited thereto. The bus 1804 may be classified into an address bus, a data bus, a control bus, and the like. For ease of representation, only one thick line is used to represent the bus in FIG. 18, but this does not mean that there is only one bus or only one type of bus.

The processor 1801 may have a data receiving and sending function, and can communicate with another device. In the apparatus shown in FIG. 18, an independent data receiving and sending module, for example, the transceiver 1803, may also be disposed and is configured to receive and send data. When communicating with the another device, the processor 1801 may transmit data through the transceiver 1803.

When the terminal device is in the form shown in FIG. 18, the processor 1801 in FIG. 18 may invoke computer-executable instructions stored in the memory 1802, to enable the terminal device to perform the method performed by the terminal device in any one of the foregoing method embodiments.

Specifically, functions/implementation processes of the sending unit, the receiving unit, and the processing unit in FIG. 13 may be implemented by the processor 1801 in FIG. 18 by invoking the computer-executable instructions stored in the memory 1802. Alternatively, functions/implementation processes of the processing unit in FIG. 13 may be implemented by the processor 1801 in FIG. 18 by invoking the computer-executable instructions stored in the memory 1802, and functions/implementation processes of the sending unit and the receiving unit in FIG. 13 may be implemented through the transceiver 1803 in FIG. 18.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:
1. A communication method, comprising:
  determining, by an apparatus of a terminal device, that the terminal device supports a time sensitive networking service, wherein the apparatus is the terminal device or a chip in the terminal device; and sending, in response to determining that the terminal device supports the time sensitive networking service by the apparatus of the terminal device and to a session management network element, a session establishment request comprising a port identifier of the terminal device, information about a transmission delay between a port of the terminal device and a port of an external neighbor node, and external topology information of the port of the terminal device, wherein the external topology information indicates a connection relationship between a port of a switching node and the port of the external neighbor node.

2. The method according to claim 1, wherein the sending the session establishment request to the session management network element includes:
sending the session establishment request to the session management network element through an access and mobility management network element.

3. A communication apparatus comprising:
one or more processors coupled to at least one non-transitory computer-readable memory including instructions, wherein the one or more processors are configured to execute the instructions to cause the communication apparatus to at least perform:
determining that a terminal device supports a time sensitive networking service, wherein the communication apparatus is the terminal device or a chip in the terminal device; and
sending, to a session management network element, in response to determining that the terminal device supports the time sensitive networking service, a session establishment request comprising a port identifier of the terminal device, information about a transmission delay between a port of the terminal device and a port of an external neighbor node, and external topology information of the port of the terminal device, wherein the external topology information indicates a connection relationship between a port of a switching node and the port of the external neighbor node.

4. The communication apparatus according to claim 3, wherein the instructions for sending, to a session management network element, a session establishment request includes instructions for:
sending the session establishment request to the session management network element through an access and mobility management network element.

5. A communication method, wherein the method comprises:
receiving, by a session management network element, from a terminal device supporting a time sensitive networking service, a session establishment request comprising a port identifier of the terminal device, information about a transmission delay between the terminal device and a port of an external neighbor node, and external topology information of the port of the terminal device, wherein the external topology information indicates a connection relationship between a port of a switching node and the port of the external neighbor node; and
sending, by the session management network element, the port identifier of the terminal device and the information about the transmission delay to a centralized network configuration network element.

6. The method according to claim 1, wherein the session establishment request further comprises topology information of the port of the terminal device, and wherein the topology information of the port of the terminal device indicates a connection relationship between the port of the terminal device and the port of the external neighbor node.

7. The method according to claim 5, wherein the session establishment request further comprises topology information of the port of the terminal device, and wherein the topology information of the port of the terminal device indicates a connection relationship between the port of the terminal device and the port of the external neighbor node.

8. The method according to claim 7, further comprising:
sending, by the session management network element, the topology information of the port of the terminal device to the centralized network configuration network element.

9. The method according to claim 8, further comprising:
receiving, by the centralized network configuration network element, the topology information of the port of the terminal device.

10. The method according to claim 5, further comprising:
receiving, by the centralized network configuration network element, the port identifier of the terminal device and the information about the transmission delay.

11. The method according to claim 5, further comprising:
determining, by the terminal device, that the terminal device supports the time sensitive networking service; and
sending, by the terminal device and to the session management network element, in response to determining that the terminal device supports the time sensitive networking service, the session establishment request.

12. A communication apparatus comprising:
one or more processors coupled to at least one non-transitory computer readable memory including instructions, wherein the one or more processors are configured to execute the instructions to cause the communication apparatus to at least perform:
receiving, from a terminal device supporting a time sensitive networking service, a session establishment request comprising a port identifier of the terminal device, information about a transmission delay between the terminal device and a port of an external neighbor node, and external topology information of the port of the terminal device, wherein the external topology information indicates a connection relationship between a port of a switching node and the port of the external neighbor node; and
sending, the port identifier of the terminal device and the information about the transmission delay to a centralized network configuration network element.

13. The communication apparatus according to claim 12, wherein the session establishment request further comprises topology information of the port of the terminal device, and wherein the topology information of the port of the terminal device indicates a connection relationship between the port of the terminal device and the port of the external neighbor node.

14. The communication apparatus according to claim 13, wherein the one or more processors are configured to execute the instructions to cause the communication apparatus to further perform:
sending, the topology information of the port of the terminal device to the centralized network configuration network element.

15. A system comprising:
a session management network element comprising one or more first processors coupled to at least one first non-transitory computer readable memory including first instructions, wherein the one or more first processors are configured to execute the first instructions to cause the the session management network element to at least perform:

receiving, from a terminal device supporting a time sensitive networking service, a session establishment request comprising a port identifier of the terminal device, information about a transmission delay between the terminal device and a port of an external neighbor node, and external topology information of the port of the terminal device, wherein the external topology information indicates a connection relationship between a port of a switching node and the port of the external neighbor node; and sending, the port identifier of the terminal device and the information about the transmission delay to a centralized network configuration network element; and the centralized network configuration network element comprising one or more second processors coupled to at least one second non-transitory computer readable memory including second instructions, wherein the one or more second processors are configured to execute the second instructions to cause the centralized network configuration network element to at least perform:

receiving the port identifier of the terminal device and the information about the transmission delay.

16. The system according to claim 15, wherein the session establishment request further comprises topology information of the port of the terminal device, and wherein the topology information of the port of the terminal device indicates a connection relationship between the port of the terminal device and the port of the external neighbor node.

17. The system according to claim 16, wherein the first instructions further include instructions to cause the one or more first processors to perform:

sending the topology information of the port of the terminal device to the centralized network configuration network element.

18. The system according to claim 17, wherein the second instructions further include instructions to cause the one or more second processors to perform:

receiving the topology information of the port of the terminal device.

19. The system according to claim 15, further comprising:

the terminal device comprising one or more third processors coupled to at least one third non-transitory computer readable memory including third instructions, wherein the one or more third processors are configured to execute the third instructions to cause the terminal device to at least perform:

determining that the terminal device supports the time sensitive networking service; and sending, to the session management network element, in response to determining that the terminal device supports the time sensitive networking service, the session establishment request.

\* \* \* \* \*